(12) United States Patent
Orita

(10) Patent No.: US 7,463,948 B2
(45) Date of Patent: Dec. 9, 2008

(54) ROBOT CONTROL APPARATUS

(75) Inventor: Atsuo Orita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 11/416,066

(22) Filed: May 3, 2006

(65) Prior Publication Data
US 2006/0265103 A1 Nov. 23, 2006

(30) Foreign Application Priority Data
May 23, 2005 (JP) ............................. 2005-149993

(51) Int. Cl.
*G06F 19/00* (2006.01)

(52) U.S. Cl. .................. 700/245; 700/248; 700/253; 700/255; 700/258; 700/259; 318/480; 318/568.12; 318/580; 318/587; 318/586; 901/1; 901/3; 180/8.6; 180/168; 180/169; 180/279; 701/23; 701/24; 701/70; 701/301

(58) Field of Classification Search ........... 700/245, 700/248, 253, 255, 258, 259, 262, 264; 318/480, 318/568.12, 580, 586, 587; 180/8.6, 167, 180/168, 169, 279; 901/1, 3; 701/23, 24, 701/70, 301
See application file for complete search history.

(56) References Cited

U.S. PATENT DOCUMENTS

| 4,473,787 A | * | 9/1984 | Schick ...................... 318/587 |
| 4,780,817 A | * | 10/1988 | Lofgren ...................... 701/23 |
| 4,802,096 A | * | 1/1989 | Hainsworth et al. .......... 701/301 |
| 4,920,520 A | * | 4/1990 | Gobel et al. .................. 367/99 |
| 5,036,935 A | * | 8/1991 | Kohara ...................... 180/168 |
| 5,220,263 A | * | 6/1993 | Onishi et al. ................. 318/587 |
| 5,280,431 A | * | 1/1994 | Summerville et al. ......... 701/24 |
| 5,283,739 A | * | 2/1994 | Summerville et al. ......... 701/23 |
| 5,434,490 A | * | 7/1995 | Ishida et al. ................. 318/587 |
| 5,488,277 A | * | 1/1996 | Nishikawa et al. .......... 318/587 |
| 5,548,511 A | * | 8/1996 | Bancroft ....................... 701/23 |
| 5,652,489 A |   | 7/1997 | Kawakami |
| 6,401,846 B1 |  | 6/2002 | Takenaka et al. |
| 2005/0219114 A1 | * | 10/2005 | Kawabe et al. ................ 342/47 |

FOREIGN PATENT DOCUMENTS

| JP | 05-066831 | 3/1993 |
| JP | 08-063229 | 3/1996 |
| JP | 2001-062760 | 3/2001 |

* cited by examiner

Primary Examiner—Khoi H. Tran
Assistant Examiner—McDieunel Marc
(74) Attorney, Agent, or Firm—Squire, Sanders & Dempsey L.L.P.

(57) ABSTRACT

A robot control apparatus allows a plurality of mobile robots to carry out tasks at a reduced or minimized cost as a whole with consideration given to costs derived from an encounter with an obstacle is provided. An action optimization controller provided in the robot control apparatus generates an instruction for optimizing actions of the plurality of mobile robots so that the plurality of mobile robots carry out the tasks at a minimized cost, based upon locomotion plan information indicative of locomotion plans of the plurality of mobile robots. A possibility that any robots have an encounter with an obstacle is determined by comparing distances from the robots to the obstacles. A locomotion plan implementation cost is calculated with consideration given to the possibility of encounter, and thus an optimum route is selected based upon the locomotion plan implementation cost with the encounter-derived cost. In accordance with the optimum route, the locomotion plan for the robot is modified.

5 Claims, 10 Drawing Sheets

FIG. 4

221 TASK INFORMATION TABLE

| TASK ID | PRIORITY | IMPORTANCE | |
|---|---|---|---|
| ⋮ | ⋮ | | |
| 10 | 3 | | |
| 11 | 1 | | |
| 12 | 4 | | |
| 13 | 1.5 | | |
| 14 | 5 | | |
| 15 | 3 | | |
| ⋮ | ⋮ | | |

ENCOUNTER-DERIVED COST (Ch) CALCULATION PROCESS FLOWCHART

ROBOT CONTROL APPARATUS

CROSS-REFERENCE TO RELATED APPLICATION(S)

This application claims the foreign priority benefit under Title 35, United States Code, § 119 (a)-(d), of Japanese Patent Application No. 2005-149993 filed on May 23, 2005 in the Japan Patent Office, the disclosure of which is herein incorporated by reference in its entirety.

BACKGROUND OF THE INVENTION

This invention relates to a robot control apparatus for controlling a plurality of autonomous mobile robots, and more particularly to a robot control apparatus allowing a plurality of autonomous mobile robots to move without colliding with each other.

In a robot control system, a plurality of autonomous mobile robots (hereinafter referred to as "robots") are under control of a robot control apparatus that allows these robots to perform a variety of operations, such as a porter's service, a receptionist's service and a guide service, in a desired manner. Such operation(s) will be hereinafter referred to as "task(s)". It is generally assumed that a task is carried out in a predetermined task-execution area, such as a business office and a private house. When a number of robots move in a single task-execution area, particularly in a complex area, such as a business office and a private house, etc., any robots may possibly come upon an obstacle. Especially, in cases where the obstacle is another robot, the robots would collide with each other. With this in view, several approaches have been proposed for preventing robots from colliding with each other.

For example, JP 5-66831 A (see paragraphs 0008-0014; FIG. 4) discloses a robot system, in which robots are configured to detect nodes provided on their moving route, so as to move by aiming sequentially toward each detected node as a subsequent destination. In this robot system, each robot requests a robot control apparatus to allow a reservation for its exclusive use of a node detected in its moving route. In response to the request, the robot control apparatus determines whether the request for reservation is to be allowed, based upon the presence or absence of a prior request recorded for the same node, and if the request is allowed, the robot then moves toward the node for which its request is allowed.

Another approach as disclosed in JP 8-63229 A (see paragraphs 0012-0027; FIG. 3) configures robots to communicate with each other so as to prevent the robots from colliding with each other.

However, in the former approach (the robot system disclosed in JP 5-66831 A), for example, when a robot supposed to carry out a task of lower priority at a specific node has requested a reservation for that node earlier, another robot which submits a reservation request for the same node later is unable to make a reservation for that node, with the result that the robot submitting the belated request, which would be supposed to carry out a task of higher priority at the same node, would disadvantageously become unable to timely go to the node. In short, movement of each of the plurality of robots cannot be optimized. Further, since the robots have to make a reservation for a node before going to the node, processing for communication between each robot and the robot control apparatus would become complicate and burdensome.

The robots in the latter approach, as disclosed in JP 8-63229 A, are not capable of adjusting to changes in priority of the tasks, and thus its collision prevention operation would not be optimized. In addition, the operation implemented in each robot for preventing collision with another robot is a predetermined routine one, and thus would not be able to be optimized so as to conform to the topographic features of areas in which the robot would move.

There is a need for eliminating the aforementioned disadvantages, and it would thus be desirable to provide a robot control apparatus capable of optimizing movements of a plurality of robots.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a robot control apparatus capable of optimizing movements of a plurality of robots by allowing the plurality of robots to carry out tasks at a reduced or minimized cost as a whole with consideration given to costs derived from an encounter with an obstacle.

More specifically, one embodiment of the present invention is directed to a robot control apparatus for controlling a plurality of mobile robots. Each of the plurality of mobile robots includes a position information acquisition device for acquiring an instantaneous position and is configured to carry out a predetermined task. The robot control apparatus comprises: a robot information storage device in which the instantaneous position acquired by the position information acquisition device of each mobile robot are storable; a task information storage device in which task information is storable, the task information including an execution position and a priority for each task to be executed by a mobile robot responsible therefor; and an action optimization controller configured to generate an instruction for optimizing actions of the plurality of mobile robots so that any of the plurality of mobile robots carry out the tasks at a minimized cost, based upon locomotion plan information indicative of locomotion plans of the plurality of mobile robots, each of the locomotion plans including a route along which each mobile robot moves from an instantaneous position of the mobile robot stored in the robot information storage device to an execution position of a task stored in the task information storage device. The action optimization controller includes a locomotion plan explorer, a locomotion plan selector, a locomotion plan implementation cost calculator, a distance calculator, an encounter possibility determiner, an encounter-derived cost calculator, an optimum route selector, and a plan modification instruction generator. The locomotion plan explorer is configured to sort the locomotion plans by costs for exploration. The locomotion plan selector is configured to select at least one locomotion plan from the locomotion plans sorted in the locomotion plan explorer. The locomotion plan implementation cost calculator is configured to calculate a locomotion plan implementation cost to be entailed when the plurality of mobile robots move in accordance with the locomotion plan information updated by the at least one locomotion plan selected in the locomotion plan selector. The distance calculator is configured to calculate distances from the plurality of mobile robots to obstacles for each point of time during implementation of the locomotion plans or for each position on routes along which the plurality of mobile robots move, in accordance with the locomotion plan information updated by the at least one locomotion plan selected in the locomotion plan selector. The encounter possibility determiner is configured to compare the distances calculated by the distance calculator with a predetermined value, and to determine that at least one of the plurality of mobile robots has a possibility of encounter with an obstacle if at least one of the distances is below the predetermined value. The encounter-derived cost calculator is configured to calculate an encounter-derived cost if the encounter possibility determiner determines that at least one of the plurality of mobile robots has a possibility of encounter with an obstacle. The optimum route selector configured to determine optimum locomotion plan information such that the tasks are carried out at a minimized cost, based upon the locomotion plan implementation cost calculated by the locomotion plan implementation cost calculator and the encounter-derived cost calculated by the encounter-derived cost calculator. The plan modification instruction generator is configured to generate a plan modification instruction for causing at least one of the plurality of mobile robots to move in accordance with the optimum locomotion plan information determined by the optimum route selector.

With this configuration, the actions of the plurality of mobile robots can be optimized by considering a cost derived from a possible encounter with an obstacle so that the plurality of mobile robots can carry out their tasks at a reduced or minimized cost as a whole.

The locomotion plan may for example be composed of a combination of the instantaneous position of the mobile robot and accumulated distance from the initial position to the instantaneous position, or composed of a combination of an instantaneous position and a time when the robot is located in the instantaneous position.

The plan modification instruction may include various instructions given to the mobile robot to modify its locomotion plan in accordance with the updated locomotion plan and the encounter-derived cost. Modification of the locomotion plan may include one which allows the mobile robot to have an encounter with an obstacle, and one which does not allow the mobile robot to have an encounter with an obstacle. Depending upon the predetermined value as a reference value for use in determining whether the mobile robot has the possibility of encounter with an obstacle, the mobile robot may possibly collide with the obstacle. In this instance, the instruction which allows the mobile robot to have an encounter with an obstacle refers to an instruction given to the mobile robot to take a circumventive action for avoiding collision with the obstacle without changing its route or passageway, and the instruction which does not allow the mobile robot to have an encounter with an obstacle refers to an instruction given to the mobile robot to change its route or passageway so as to avoid collision with the obstacle. Accordingly, if such collision between the mobile robot and the obstacle is assumed to be a possible event, the plan modification instruction may be an instruction given to the mobile robot to take such circumventive actions.

The cost as used in defining the present invention above may include, for example, a task execution cost for carrying out a task, a task-and-locomotion cost for moving while carrying out a task, a locomotion cost for moving to a task execution position, and any combinations thereof. These costs may be converted into time or energy of battery, etc. for calculation.

In one exemplary embodiment where the above obstacles include another mobile robot, the encounter-derived cost calculator of the action optimization controller may comprise a temporary halt cost calculator configured to calculate a cost required for a temporary halt such that a first mobile robot responsible for a lower priority task waits at a temporary halt position on a planned route until a second mobile robot responsible for a higher priority task passes through a common portion of routes on which the first and second mobile robots are planned to move. In this embodiment, the plan modification instruction may include an instruction given to the first mobile robot to make a temporary halt at the temporary halt position if the sum of the cost calculated by the temporary halt cost calculator and a cost to be entailed when at least one locomotion plan for the at least one of the plurality of mobile robots determined by the encounter possibility determiner to have a possibility of encounter with an obstacle is implemented turns out to be the minimized cost.

In this embodiment, there is a possibility of encounter between mobile robots having tasks assigned thereto with different priorities. With the above configuration, the priorities of the tasks can be reflected to the circumventive actions, and an unfavorable situation can be avoided such that the second mobile robot responsible for a higher priority task has to make a temporary halt, waiting until the first mobile robot responsible for a lower priority task passes the second mobile robot.

In another exemplary embodiment where the above obstacles include another mobile robot, alternatively or additionally, the above robot control apparatus may further comprise a circumvention controller. The circumvention controller may include a give-way motion instruction generator, and a return instruction generator. The give-way motion instruction generator is configured to generate a give-way motion instruction for causing a first mobile robot responsible for a lower priority task to move from a first route determined based upon the selected locomotion plan information to a give-way position so as to give way to a second mobile robot responsible for a higher priority task. The return instruction generator is configured to generate a return instruction for causing the first mobile robot to return from the give-way position to the first route. In this embodiment, the encounter-derived cost calculator may comprise a circumvention cost calculator configured to calculate a difference between a cost to be entailed when the first mobile robot moves to the give-way position and a cost to be entailed when the first mobile robot proceeds along the first route without moving to the give-way position; and the plan modification instruction may include the give-way motion instruction and the return instruction given to the circumvention controller if the sum of the cost calculated by the circumvention cost calculator and a cost to be entailed when at least one locomotion plan for the at least one of the plurality of mobile robots determined by the encounter possibility determiner to have a possibility of encounter with an obstacle is implemented turns out to be the minimized cost.

With this configuration, the first and second mobile robots can move without colliding with each other. Consequently, the return instruction can be generated at an appropriate time to which the priorities of the tasks are reflected, and the second mobile robot responsible for a higher priority task can return to its originally planned route earlier than the first mobile robot responsible for a lower priority task does.

In an alternative embodiment where the above obstacles include another mobile robot, alternatively, the above robot control apparatus may further comprises a circumvention controller. The circumvention controller may comprise: a give-way motion instruction generator configured to generate a give-way motion instruction for causing a first mobile robot responsible for a lower priority task to move from a first route determined based upon the selected locomotion plan information to a give-way position so as to give way to a second mobile robot responsible for a higher priority task; a circumvention instruction generator configured to generate a circumvention instruction for causing the second mobile robot to move from a second route determined based upon the selected locomotion plan information to a circumvention position so as to allow the first and second mobile robots to pass each other; and a return instruction generator configured to generate a return instruction for causing the first mobile robot to return from the give-way position to the first route, and the second mobile robot to return from the circumvention position to the second route. In this embodiment, the encounter-derived cost calculator may comprise a circumvention cost calculator configured to calculate a difference between the sum of costs to be entailed when the first and second mobile robots move to the give-way position and circumvention position respectively, and a cost to be entailed when the first and second mobile robots proceed along the first and second route without moving to the give-way position and the circumvention position, respectively; and the plan modification instruction may include the give-way motion instruction, the circumvention instruction and the return instruction given to the circumvention controller if the sum of the cost calculated by the circumvention cost calculator and a cost to be entailed when at least one locomotion plan for the at least one of the plurality of mobile robots determined by the encounter possibility determiner to have a possibility of encounter with an obstacle is implemented turns out to be the minimized cost.

With this configuration, the first and second mobile robots can pass each other to move without colliding with each other. Consequently, the return instruction can be generated at an appropriate time to which the priorities of the tasks are reflected, and the second mobile robot responsible for a higher priority task can return to its originally planned route earlier than the first mobile robot responsible for a lower priority task does.

In yet another exemplary embodiment, the action optimization controller may be further configured to receive a plan switch request signal from a mobile robot, and to generate, in response to the received plan switch request signal, an instruction for optimizing an action of the mobile robot based upon locomotion plan information indicative of another locomotion plan different from a locomotion plan originally assigned to the mobile robot.

With this configuration, if the mobile robots are configured to transmit a plan switch request signal to the action optimization controller of the robot control apparatus when the mobile robot comes upon a situation in which the mobile robot cannot proceed along its originally planned route any longer, the mobile robot can switch its locomotion plan into an appropriate plan in which the mobile robot can travel along a different route to carry out a task at a minimized cost. Consequently, for example, if the mobile robot comes upon an object at rest or other static obstacle such as a temporary closure to passage or traffic which is not registered in the map data, the mobile robot can detour along an optimum route so as to carry out the task swiftly.

According to the present invention, actions of a plurality of mobile robots can be optimized as a whole with consideration given to costs to be possibly entailed when the mobile robots encounter with obstacles. For example, if any of the plurality of the mobile robots is expected to come near an obstacle, instructions for modifying the locomotion plans can be generated based upon the locomotion plan execution cost and the encounter-derived cost concerning the plurality of the mobile robots in question. Therefore, the mobile robots can be caused to travel along the best routes for carrying out their own tasks efficiently while avoiding collision of the mobile robots with obstacles.

Other advantages and further features of the present invention will become readily apparent from the following description of preferred embodiments with reference to accompanying drawings.

BRIEF DESCRIPTION OF THE DRAWINGS

The aspects of the present invention will become more apparent by describing in detail illustrative, non-limiting embodiments thereof with reference to the accompanying drawings, in which:

FIG. 4 is a diagram for explaining a process executed by a task manager in the robot control apparatus;

DETAILED DESCRIPTION OF THE EXEMPLARY EMBODIMENTS

A description will be given of exemplary embodiments of the present invention with reference made to the drawings where appropriate.

(Configuration of Robot Control System)

Figure 1:
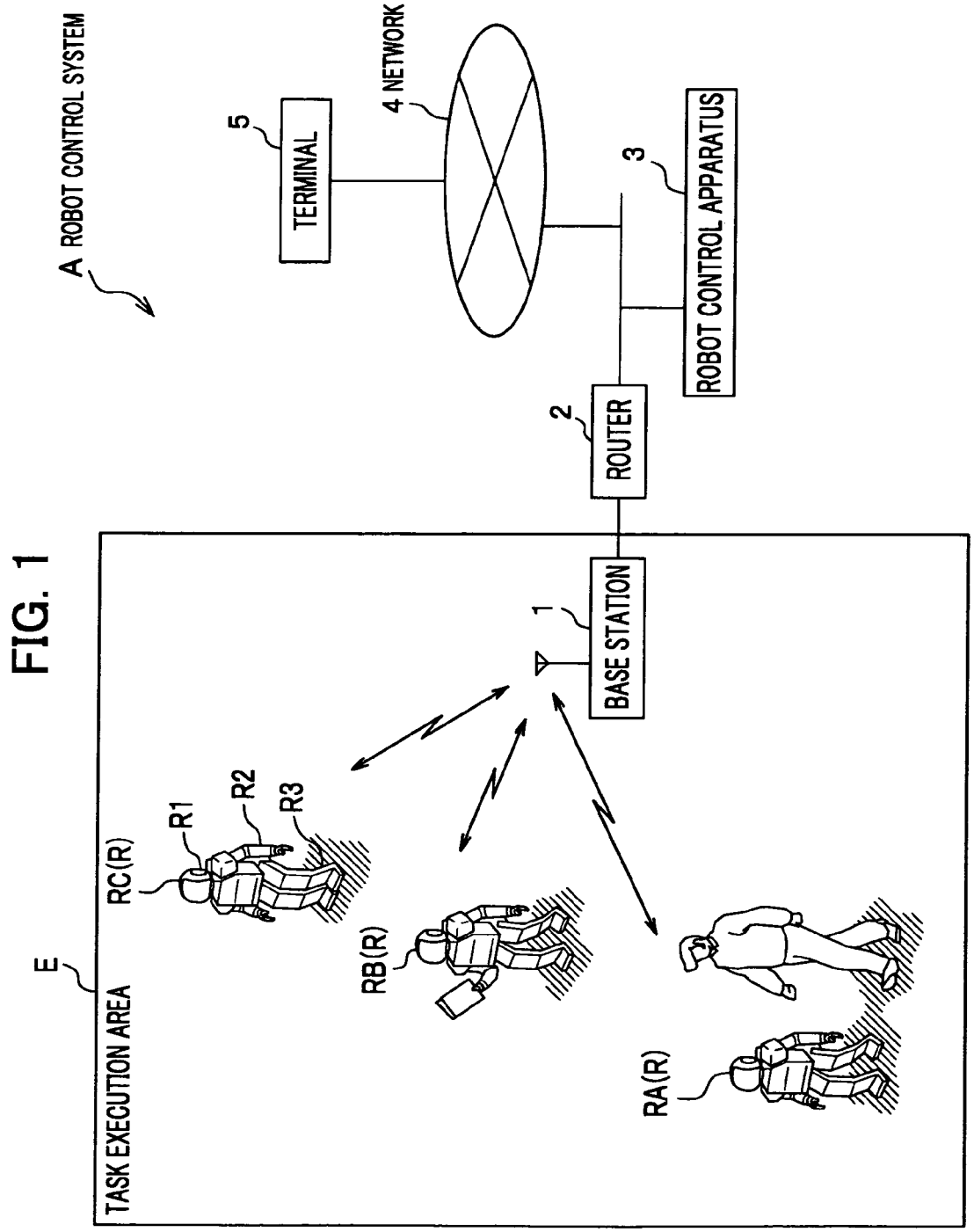
FIG. 1 schematically shows a system configuration of a robot control system to which is applicable a robot control apparatus according to one exemplary embodiment of the present invention.

Referring now to FIG. 1, a robot control system which incorporates a robot control apparatus according to an exemplary embodiment of the present invention will be described in detail.

As shown in FIG. 1, the robot control system A includes a plurality of robots RA, RB and RC. Note that when an unspecified robot or robots are generally referred to, the robot(s) will be designated simply by "R". Each robot R is configured to carry out a task (or a series of tasks) in accordance with a task executive plan (task schedule) which has been organized for each robot R and stored in a robot control apparatus 3. The robot control system A is implemented with consideration given to the cost derived from encounter among the plurality of robots R so that a plurality of tasks as a whole can be carried out efficiently by the plurality of robots R.

In the embodiment illustrated in FIG. 1, the robot control system A includes a plurality of robots R, a base station 1 capable of establishing wireless communication with the robots R, a robot control apparatus 3 communicatively coupled with the base station through a router 2, and a terminal 5 communicatively coupled with the robot control apparatus 3 through a network 4.

The robots R are configured to carry out their own tasks in accordance with task executive instructions transmitted from the robot control apparatus 3. In one embodiment, at least two robots R are placed in a task execution area E defined in advance as an area in which the robots R carry out their tasks.

In FIG. 1, illustrated by way of example are: a robot RA carrying out a receptionist's task, i.e., conducting a visitor to a predetermined place such as a reception room and an assembly room; a robot RB carrying out a porter's task, i.e., carrying and delivering burdens or baggage to somebody; and a robot RC carrying out a standby task of waiting for a new task to be assigned.

The base station 1 is configured to enable a data exchange between the robots R and the robot control apparatus 3. To be more specific, the base station 1 in operation receives, and transmits to a robot R, a task executive instruction output from the robot control apparatus 3, and receives, and transmits to the robot control apparatus 3, data indicative of status of a robot R transmitted from the robot R (status information) or a signal indicative of receipt of the task executive instruction by the robot R (acknowledgment signal). In one embodiment, at least one base station 1 is provided in the task execution area E, and the number of the base stations 1 to be provided may be determined so that the data exchange between the robots R and the robot control apparatus 3 can be established without fail. In an exemplary embodiment where the task execution area E is defined to extend over two or more floors of a building, the base station 1 may preferably be provided in each floor; in another exemplary embodiment where the task execution area E is too broad to be covered by a single base station 1, two or more base stations 1 may preferably be installed in geographically dispersed locations on the task execution area E.

The robot control apparatus 3 has a task executive plan (task schedule) organized for each of robots R to carry out a task (or a series of tasks), and is configured to control actions (motion or standby) of the robots R so that the robots R can carry out their tasks at a minimized cost as a whole.

The terminal 5 allows an operator to carry out operations, for example, as follows: (1) to register tasks to be carried out by the robots R; (2) to change or update the task schedules which have been organized and stored in the robot control apparatus 3; (3) and to input instructions for actions of each robot R.

Discussions given in detail below will focus on configurations of the robot R and the robot control apparatus 3.

[Robot]

The robot (mobile robot) R in the illustrated embodiment is an autonomous mobile biped walking robot. The robot R is configured to carry out a task or tasks mainly in accordance with a task executive instruction transmitted from the robot control apparatus 3. As shown in FIG. 1, the robot R has a body provided with a head R1, two arms R2 and two legs R3. The head R1, arms R2 and legs R3 are actuated independently by corresponding actuators; and a bipedal locomotion of the robot R is regulated under control of an autonomous motion regulation unit 50 (see FIG. 2). Details of such a biped walking mechanism are furnished for example in JP 2001-62760 A and its family U.S. Pat. No. 6,401,846 B1, the disclosure of which is herein incorporated by reference in its entirety.

In addition to the head R1, arms R2 and legs R3 mentioned above, the robot R includes, as shown in FIG. 2, two cameras C, one speaker S, two microphones MC, an image processing unit 10, a voice processing unit 20, a main control unit 40, an autonomous motion regulation unit 50, a wireless communication unit 60, a battery 70, and an obstacle detection unit 80. The robot R further includes a gyrosensor SR1 and a GPS receiver SR2 which serve as a position information acquisition device to acquire an instantaneous position of the robot R to generate instantaneous position information indicative of the current position.

[Camera]

The camera C is an image sensor capable of capturing a scene and converting an optical image into digital data; for example, a color CCD camera or a multi-color pickup unit using charge-coupled devices (charge-coupled image sensor) may be used therefor. Two cameras C are arranged in the present embodiment right and left on substantially the same level, and the images captured by these cameras C are transmitted as digital signals respectively to the image processing unit 10 to enable stereoscopic vision. The cameras C, as well as the speaker S and the microphones MC, are installed in the head R1 of the robot R.

[Image Processing Unit]

The image processing unit 10 is configured to receive images transmitted from the cameras C and to recognize any obstacles and/or persons around the robot R by processing the images so as to grasp the surrounding circumstances of the robot R from the images captured by the cameras C. The image processing unit 10 includes a stereo processor 11a, a moving object extractor 11b and a face recognizer 11c.

The stereo processor 11a is configured to perform pattern matching of the two images captured by the right and left cameras C, thereby calculating parallax between corresponding pixels in the right and left images so as to generate a parallax image, and to output the parallax image generated together with the original captured images to the moving object extractor 11b. It is understood that the parallax calculated as above in the stereo processor 11a represents a distance from the robot R to an object captured by the cameras C.

The moving object extractor 11b is configured to extract a moving object in the captured images based upon data output from the stereo processor 11a. Extraction of the moving object is performed for the purpose of recognizing a person on the presumption that the moving object is the person.

In order to extract a moving object, the moving object extractor 11b is configured to retain past few frames of the image, so as to compare the latest frame (last captured image of a scene) with the past frames (previously captured images of the same scene) for pattern matching, thereby calculating a motion amount of each pixel to generate a motion amount image. The moving object extractor 11b determines, from the parallax image and the motion amount image, whether a moving object is in the captured images; i.e., if pixels of a large motion amount are observed within a specific limited range of distances, the moving object extractor 11b assumes that there exists a moving object (e.g., person) in an area composed of those pixels, and extracts the moving object as a parallax image with the specific limited range of distances, to outputs the parallax image for the extracted moving object to the face recognizer 11c.

The face recognizer 11c is configured to extract a skin-color portion from the extracted moving object, so as to recognize an area of a face from a size, shape and so forth of the skin-color portion. Similarly, areas corresponding to hands are recognized from a size, shape, etc. of other skin-color portions. Information indicative of the area recognized as the face is output to the main control unit 40 for use in determining the motion of the robot R and in an attempt to communicate with that person, and is output to the wireless communication unit 60 so that the information is transmitted via the base station 1 to the robot control apparatus 3.

[Voice Processing Unit]

The voice processing unit 20 includes a voice synthesizer 21*a* and a voice recognizer 21*b*. The voice synthesizer 21*a* is configured to generate voice data from text data based upon instructions on a speech action determined by and transmitted from the main control unit 40, and to cause the speaker S to output a voice corresponding to the instructed speech action. To generate the voice data, the voice processing unit 20 utilizes pre-stored information on the correspondence of the voice data and the text data associated with each other.

The voice recognizer 21*b* is configured to receive an audio signal from the microphones MC to detect and recognize voice data therefrom, to generate text data from the recognized voice data utilizing pre-stored information on the correspondence of the text data and the voice data associated with each other, and to transmit the text data to the main control unit 40.

[Main Control Unit]

The main control unit 40 is configured to generate a signal to be transmitted to the robot control apparatus 3 that will be described later, and to control the components of the robot R which include image processing unit 10, voice processing unit 20, autonomous motion regulation unit 50, wireless communication unit 60 and obstacle detection unit 80, based upon task executive instructions output from the robot control apparatus 3.

More specifically, upon receipt of a task executive instruction output from the robot control apparatus 3, the main control unit 40 generates a signal indicative of the receipt of the task executive instruction (acknowledgment signal), and transmits the acknowledgment signal through the wireless communication unit 60 to the robot is control apparatus 3. The main control unit 40 then generates control signals for controlling the components (image processing unit 10, voice processing unit 20, autonomous motion regulation unit 50, wireless communication unit 60 and obstacle detection unit 80), and transmits the generated control signals to the respective components of the robot R on an as-needed basis.

The main control unit 40 further generates data indicative of status of the robot R (status information) at predetermined time intervals, and transmits the generated status information through the wireless communication unit 60 to the robot control apparatus 3. Hereupon, the status information is information used by the robot control apparatus 3 that will be described later to determine whether any two robots R will possibly come upon each other. In the present embodiment, the status information includes: (i) coordinate data indicative of the current position of the robot R (current position information); (ii) battery level information indicative of a remaining amount of charge in the battery 70 installed in the robot R; and (iii) data composed of a task ID indicative of contents of a task that the robot R is currently executing and a progress indicative of the stages of development of the task corresponding to the task ID (task information).

In the present embodiment, the main control unit 40 is configured (1) to generate and output the status information at predetermined time intervals, but may alternatively be configured (2) to generate and output the status information when the battery level lowers below a predetermined threshold, or (3) to generate and output the status information upon receipt of a signal requesting transmission of status information (data request signal) from the robot control apparatus 3. The status information may be generated and output in varying combinations of the above operation modes (1)-(3) where appropriate.

[Autonomous Motion Regulation Unit]

The autonomous motion regulation unit 50 includes a head regulator 51*a*, an arm regulator 51*b* and a leg regulator 51*c*. The head regulator 51*a* causes the head R1 to be actuated in accordance with instructions of control signals transmitted from the main control unit 40; the arm regulator 51*b* causes the arms R2 to be actuated in accordance with instructions of control signals transmitted from the main control unit 40; and the leg regulator 51*c* causes the legs R3 to be actuated in accordance with instructions of control signals transmitted from the main control unit 40. The autonomous motion regulation unit 50, head R1, arms R2 and legs R3 constitute an autonomous motion unit.

[Wireless Communication Unit]

The wireless communication unit 60 is a communication device for transmitting and receiving data to and from the robot control apparatus 3. The wireless communication unit 60 includes a public network communication device 61*a* and a wireless communication device 61*b*. The public network communication device 61*a* is means for wireless communication using public networks such as the cellular phone network and the PHS (personal handyphone system) microcellular phone network. On the other hand, the wireless communication device 61*b* is means for wireless communication using a short-distance wireless network such as a wireless local area network (LAN) in conformity with IEEE 802.11b standard. The wireless communication unit 60 selects either of the public network communication device 61*a* or the wireless communication device 61*b* in response to a connection request from the robot control apparatus 3, so as to establish data communication with the robot control apparatus 3.

The battery 70 is a source of power supply required for operation or processing of the components in the robot R.

The gyrosensor SR1 and the GPS receiver SR2 are configured to generate coordinate data indicative of the current position of the robot R, so as to transmit the generated coordinate data to the main control unit 40. The coordinate data is utilized to determine the actions of the robot R as well as to generate the status information as described above.

The obstacle detection unit 80 is a device for detecting an obstacle around the robot R, and configured for example to determine in which direction within a predetermined range of distances any obstacle exists, based upon an obstacle detection notification signal output from an ultrasonic sensor and a table from which is retrievable a position or orientation of the ultrasonic sensor, to thereby generate obstacle direction data. The thus-generated obstacle direction data is transmitted to the main control unit 40. Since ultrasonic waves emitted from the ultrasonic sensor are reflected off a transparent material, the obstacle detection unit 80 in the present embodiment can detect an obstacle made of glass or other transparent material which cannot be detected by the image processing unit 10

[Robot Control Apparatus]

The robot control apparatus 3 of FIG. 1 is configured mainly to have a task executive plan (task schedule) organized and stored therein for each robot R which task executive plan is provided to be executed by the robot R, and to control a plurality of robots R so that the plurality of robots R can carry out their tasks at a minimized cost as a whole. To minimize the cost as a whole, the robot control apparatus 3 is configured to examine all possibilities, if any, of encounters among the plurality of robots R, based upon varying distances between the robots R which are moving to carry out their tasks, and to calculate costs derived from the possible encounters if it is determined that there is a possibility of encounters.

Figure 3:
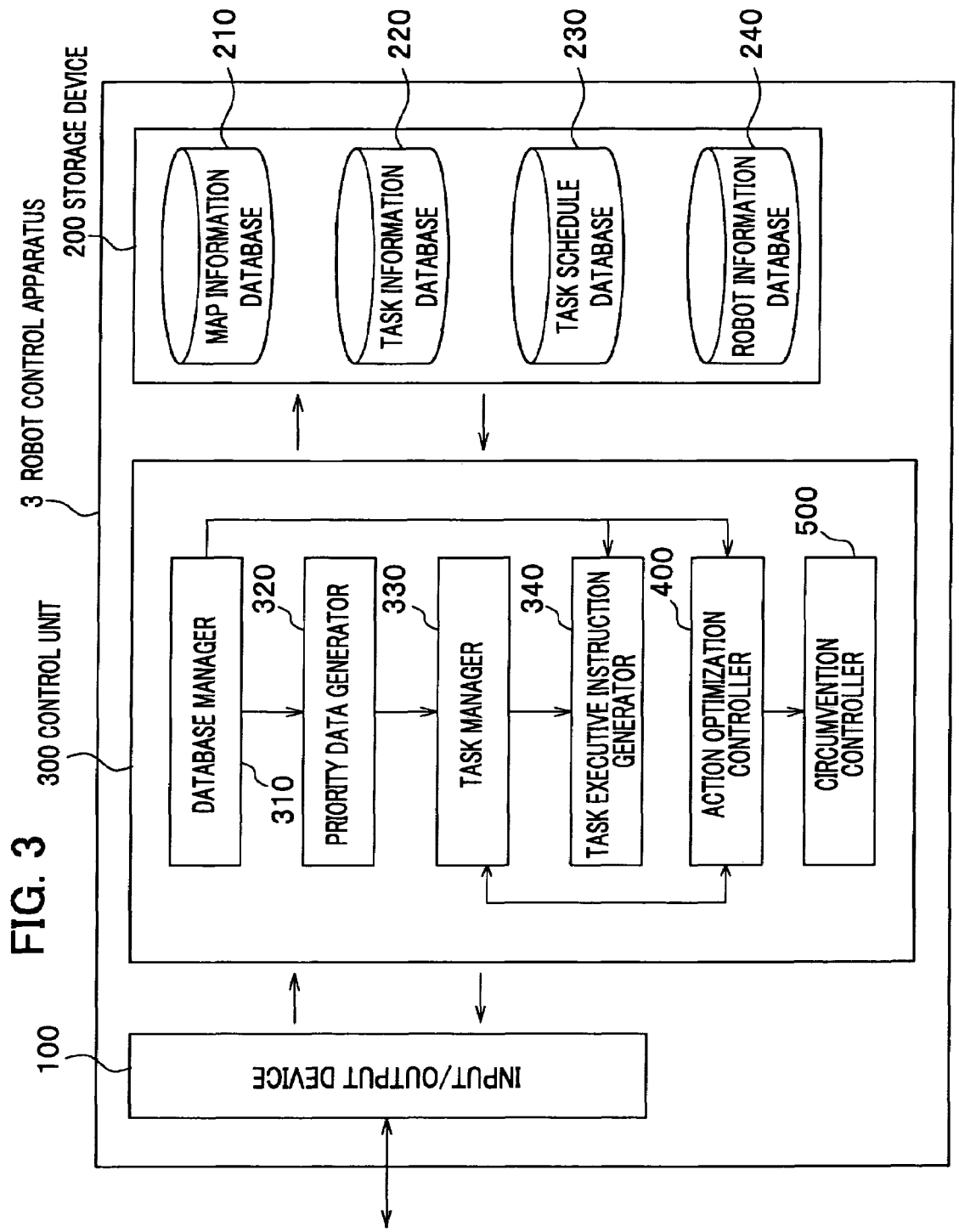
FIG. 3 is a block diagram of a robot control apparatus as shown in FIG. 1.

As shown in FIG. 3, the robot control apparatus 3 includes an input/output device 100, a storage device 200 and a control unit 300.

[Input/Output Device]

The input/output device 100 is an interface by which the robot control apparatus 3 exchanges data with the robots R via the router 2 and the base station 1 and with the terminal 5 via the network 4. Through the input/output device 100, in this embodiment, the robot control apparatus 3 exchanges the following data: status information and an acknowledgment signal that are received from the robots R; a signal requesting entry or update of a task that is received from the terminal 5 (task request signal); a task executive instruction that is generated in a task execution instruction generator 340 (for details, see below); a plan implementation instruction, a plan halt instruction, etc. that are generated in an action optimization controller 400 (for details, see below); a circumvention control instruction, etc. that is generated in a circumvention controller 500 (for details, see below).

The input/output device 100 receives from outside, and outputs to a database manager 31 that will be described later, the status information, the task request signal and the acknowledgment signal.

[Storage Device]

The storage device 200 is configured to retain data required for control over the robots R. The storage device 200 contains, but not limited to, a map information database 210, a task information database 220, a task schedule database 230, and a robot information database 240.

<Map Information Database>

The map information database 210 is a database containing map information (global map) of a task execution area E (area within which the robots R are supposed to execute tasks). In the map information database 210, objects that exist in the task execution area E, such as passages (passageways), stairs (stairways), elevators, and rooms, are registered in association with coordinate data (e.g., node information, etc.) indicative of positions in the task execution area E.

Accordingly, in the present embodiment, by consulting the map information database 210 from the viewpoint of an instantaneous position of a robot R at the present moment, the positional relationship between the robot R located in the task execution area E and a specific object (target) in the task execution area E can be retrieved. The positional relationship which the map information database 210 can provide includes: for example, a distance from the robot R to the target, and a direction in which the target is positioned with respect to the front direction of the robot R.

The robot control apparatus 3 is configured to generate signals instructing autonomous motion and execution of tasks of robots R (task executive instruction), based upon the positional relationship; thus, the robots R can be allowed to move to a desired position (e.g., task start position) in the task execution area E via the shortest optimum route, so that the robots R can autonomously move and carry out their tasks in an optimized and timely manner.

In this exemplary embodiment, in order to update the map information stored in the map information database 210, a database manager 310 of the control unit 300 that will be described later operates and allows an operator to manipulate the terminal 5 to input data therethrough.

<Task Information Database>

The task information database (also referred to as "task information storage device") 220 is a database containing information regarding tasks which the robots R are supposed to carry out (task data).

The task information database 220 provides various fields for each record which is identifiable by a unique identifier ("task ID") assigned to each task. Other than the "task ID", the fields of the record corresponding to each task may include: (i) as details on properties of the task, "priority" indicative of a rating of preferential treatment in execution of the task; "importance" indicative of how the task weighs important; "robot ID" indicative of an identifier of a robot supposed to carry out the task; "task content" indicative of the content of the task (e.g., receptionist's task, porter's task, etc.); "start position" indicative of a position within the task execution area E in which a robot is supposed to start the task; "end position" indicative of a position within the task execution area E in which a robot is supposed to finish the task; and "turnaround time" indicative of time required to carry out the task, and may further include: (ii) as details on status of the task, "start time" indicative of a scheduled time when a robot is supposed to start the task; "end time" indicative of a scheduled time when a robot is supposed to finish the task; and "status" indicative of the status of the task, such as 'finished', 'executing' and 'to be executed'.

<Task Schedule Database>

The task schedule database 230 is a database containing information regarding a schedule of tasks, and provides various fields which include "execution order" of the tasks to be executed by robots R, "task ID" for use in identifying a specific task among those registered in the task information database 220, "priority" of the tasks, "task content" of the tasks, and "status" of the tasks.

In the task schedule database 230, the information itemized in fields as described above is organized for each robot R located in the task execution area E, so that the tasks assigned to each robot R and the order of the tasks to be carried out by the robot R are retrievable.

In the task schedule database 230, tasks as 'to be executed' in a waiting queue among the tasks registered in the task information database 220 are assigned to the robots R, and the order of tasks to be executed by each robot R is determined.

<Robot Information Database>

The robot information database (also referred to as "robot information storage device") 240 is a database containing data indicative of statuses of the robots R (status information). In the robot information database 240 is provided various fields of "instantaneous position information", "task information" and "battery level information" as described above, plus information or data regarding the presence or absence of anomaly in driving systems of the robots R, and other information, and these fields of itemized information are associated with the "robot ID" or identification information. A predetermined number of instantaneous data of position information (e.g., node information) of each robot R to a task execution position are stored in association with the times at which the robot R is in positions (or nodes) corresponding to the stored instantaneous position information.

The content of each item of information stored in the robot information database 240 is updated by the database manager 310 of the control unit 300 that will be described later, based upon the status information transmitted from the robots R.

[Control Unit]

The control unit 300 includes, as shown in FIG. 3, a database manager 310, a priority data generator 320, a task manager 330, a task executive instruction generator 340, an action optimization controller 400 and a circumvention controller 500.

<Database Manager>

The database manager 310 is configured to manage entry or registration of data into the databases 210, 220, 230 and 240 stored in the storage device 200, and to manage update of data registered in the databases 210, 220, 230 and 240.

For example, when the database manager 310 receives status information indicative of the status of a robot R through the input/output device 100, the database manager 310 consults the robot information database 240 based upon a robot ID included in the status information, and updates the contents (data) of itemized information in the robot information database 240 identified by the robot ID with the contents (data) of itemized information acquired from the status information of the robots R.

If the task information included in the received status information indicates that the robot R has "finished" execution of a task, the database manager 310 proceeds to generate an executive instruction request signal requesting the task executive instruction generator 340 to generate a task executive instruction (for instructing the robot R to execute a task). Then, the database manager 310 transmits the generated task executive instruction request signal to the task executive instruction generator 340. Upon receipt of the task executive instruction request signal transmitted from the database manager 310, the task executive instruction generator 340 generates the task executive instruction so as to cause the robot R to carry out the next task which has been assigned to the robot R.

When the database manager 310 receives from the input/output device 100 a task request signal requesting registration of a new task or update of an existing task which have been entered at the terminal 5, the database manager 310 updates the task information database 220 (updating the contents of itemized information stored therein), generates a task update signal indicating that the task information database 220 has been updated, and transmits the generated task update signal to the priority data generator 320.

<Priority Data Generator>

The priority data generator 320 is configured to determine priority of tasks to be executed by the robots R. To be more specific, when the priority data generator 320 receives a task update signal from the database manager 310, the priority data generator 320 determines the priorities of 'to be executed' tasks among those registered in the task information database 220.

The priority data generator 320 then generates a schedule request signal requesting the task manager 330 to organize schedules for 'to be executed' (unfinished) tasks among those registered in the task information database 220, and transmits the generated schedule request signal to the task manager 330.

In the present embodiment, determination of priority of each task is made with consideration given to: the importance of the task set at the time of registration of the task into the task information database 220; the distance between the start position of the task and the robot R located closest to the task start position; and the time remaining until the start time or end time of the task from the present time.

Specifically, the priority data generator 320 determines the priority of each task by calculating the priority Q of the task using Equation (1) below:

$$Q=(T_{pri}+n(T_{sp}))\cdot f(T_{err}) \quad (1)$$

where $T_{pri}$ is the importance of the task determined as desired at the time of registration of the task into the task information database 220, $T_{sp}$ is the time required for the robot located closest to the start position of the task to move to the start position, $n(T_{sp})$ is the distance-dependent importance determined so that when a robot R exists near the start position of the task, the robot R is caused to carry out the task preferentially, and $f(T_{err})$ is the time-dependent importance determined so that a task to be carried out preferentially is determined based upon the time remaining until the start time or end time of the task from the present time.

In this exemplary embodiment, the importance $T_{pri}$ of the task is set in increments of 0.5 between 1.0 and 5.0 inclusive. The task of the least importance $T_{pri}$ is designated by 1.0, while the task of the greatest importance $T_{pri}$ is designated by 5.0. The distance-dependent importance $n(T_{sp})$ is determined to be greater, as the robot R is located closer to the start position of the task, and $n(T_{sp})$ represents a predetermined positive value only if $T_{sp}$ is equal to or smaller than a predetermined threshold, while $n(T_{sp})$ represents '0' (zero) if $T_{sp}$ is greater than the predetermined threshold. The time-dependent importance $f(T_{err})$ is set in the range from 0 to 1, where $f(T_{err})$ rapidly increases from '0' to '1' as the start time of the task approaches, and represents the maximum value '1' from a reference time (the time preceding the start time of the task by a period of time required for a robot R to execute the task) to the end time of the task, and gradually decreases to '0' after the end time of the task.

More specifically, in this exemplary embodiment, the time-dependent importance $f(T_{err})$ is calculated using Equation (2) during the period when the present time is at a time before the reference time, using Equation (3) during the period when the present time is at a time after the reference time and before the end time of the task, and using Equation (4) during the period when the present time is at a time after the end time of the task:

$$f(T_{err})=\exp(-K((T_{err}-T_{time})/T_{time})) \quad (2)$$

$$f(T_{err})=1 \quad (3)$$

$$f(T_{err})=(1+\cos((\pi/T_{time})(T_{err}/C_{obli})))/2 \quad (4)$$

where $T_{err}$ is the time interval between the present time and the start time of the task, which time interval represents a positive value before the start time of the task, and represents a negative value after the start time of the task, $T_{time}$ is the period of time required to execute the task (turnaround time for the task), and $C_{obli}$ is an oblivion coefficient such that if $T_{err}=-C_{obli}\cdot T_{time}$, then $f(T_{err})=0$.

Since the priority Q of each task is determined, as described above, with consideration given to: the importance of the task set at the time of registration of the task into the task information database 220; the distance between the start position of the task and the robot R located closest to the task start position; and the time remaining until the start time or end time of the task from the present time, an optimum value can be obtained as the priority Q of the task.

<Task Manager>

The task manager 330 is configured to establish task executive plans (task schedules) under which robots R carry out their own tasks. The task manager 330 determines which robot R will be caused to carry out a task based upon the priority determined for each task, and determines the order of execution of the tasks assigned to each robot R. In other words, the task manager 330 establishes a task executive plan (task schedule) to be executed by each robot R.

To be more specific, when the task manager 330 receives a schedule request signal from the priority data generator 320, the task manager 330 acquires data regarding 'to be executed' (unfinished) tasks among those registered in the task information database 220. The task manager 330 then classifies the tasks based upon the priority included in the task data.

By way of example, it is assumed that the tasks of the priority less than 2 are classified into group 'C', those of the priority of 2 or more and less than 4 are classified into group 'B', and those of the priority of 4 or more are classified into group 'A', and that the tasks of the task IDs 10-15 shown in FIG. 4 are 'to be executed' and have the priority values determined in the priority data generator 320 as shown in FIG. 4. In this example, the task manager 330 classifies the tasks having the task IDs '11' and '13' into group 'C', the tasks having the task IDs '10' and '15' into group 'B', and the tasks having the task IDs '12' and '14' into group 'A'.

Subsequently, the task manager 330 organizes a schedule for the tasks classified in the group consisting of the tasks of the highest priorities (i.e., group 'C' in this example) among the existing three groups 'A', 'B' and 'C'. More specifically, the task manager 330 enumerates all possible combinations of various patterns of task assignment to each robot R located in the task execution area E and various orders of execution of the tasks by the robot R (combinations defined based upon which robot each task is assigned to and how the tasks assigned to the robot R are ordered). The task manager 330 then calculates the total cost for each combination assuming that the tasks are assigned to robots R and the tasks are carried out by the robots in specific orders in accordance with the combination, so that the combination in which the total cost exhibits a minimum value is retrieved.

The next discussion will be extended by taking for example a situation where two robots RA, RB are put in the task execution area E, and the tasks classified into the aforementioned group 'A' includes tasks of the task IDs '12' and '14'. In this situation, six combinations are conceivable in terms of patterns of task assignment to the robots RA, RB and orders of execution of the tasks: the combinations include four instances where the both tasks are carried out by the same robot RA or RB in two possible orders, and two instances where the two tasks are divided and carried out respectively by the two robots RA and RB.

Accordingly, in this situation, the task manager 330 calculates the total cost required for each instance where all the tasks are carried out by the robots R (RA, RB) located in the task execution area E in accordance with the task schedule determined depending upon the combination that is adopted.

In this exemplary embodiment, the total cost $C_{Total}$ is calculated by Equation (5) as follows:

$$C_{Total} = w \cdot C_{all} + (1-w) \cdot C_{all\_complete} \quad (5)$$

where $C_{all}$ is the total amount of charge in the battery which all the robots R in the robot control system A consume by the time when the robots R finish all the tasks (operation cost), $C_{all\_complete}$ is the total period of time which elapses before all the tasks are finished, i.e., the period of time from the start time of the first task scheduled to be started first to the end time of the last task scheduled to be finished last (time cost), and w is the value of weights assigned to the operation cost and the time cost to weigh the total cost $C_{Total}$ at a desired ratio, i.e., the value set as desired in the range between 0 and 1 inclusive ($0 \leq w \leq 1$). It is appreciated that the greater the value w, the greater importance is placed on the battery consumption in the total cost ($C_{Total}$), while the smaller the value w, the greater importance is placed on the time required to carry out all the tasks up to the end (turnaround time).

To illustrate in greater detail, assuming that the robot RA carries out the task of the task ID '12', and the robot RB carries out the task of the task ID '14', $C_{all}$ is the sum of the amounts of charge in the battery to be consumed when the robot RA carries out the task of the task ID '12' and when the robot RB carries out the task of the task ID '14'. $C_{all\_complete}$ is the period of time from either, which comes earlier, of the time when the robot RA starts the task of the task ID '12' or the time when the robot RB starts the task of the task ID '14', to either, which comes later, of the time when the robot RA finishes the task of the task ID '12' or the time when the robot RB finishes the task of the task ID '14'. In an instance where the robot RB carries out the task of the task ID '14' and then the task of the task ID '12', $C_{all}$ is the amount of charge in the battery to be consumed by the robot RB from the start time of the task of the task ID '14' to the end time of the task of the task ID '12', and $C_{all\_complete}$ is the period of time which elapses from the time when the robot RB starts the task of the task ID '14' to the time when the robot RB finishes the task of the task ID '12'.

In this manner, according to this exemplary embodiment of the present invention, the task manager 330 obtains the total costs ($C_{Total}$) respectively for all the combinations, and finds a minimum-cost combination in which the obtained total cost ($C_{Total}$) exhibits the minimum value, so as to determine a task schedule by the task assignment pattern and execution order of the minimum-cost combination.

The task manager 330 repeats the same operations for the remaining groups (group 'B' and group 'C') sequentially in descending order of priority of the groups, so that the robots R are assigned to the 'to be executed' tasks in the tasks registered in the task information database 220, and the order of tasks assigned to each robot R is determined for each robot R.

The task manager 330 calculates costs of locomotion plans (hereinafter referred to as plans) $P_R = \{P_{Ri}(i=1, 2, \ldots, m)\}$ as shown below in Equation (6), sorts the plans $P_{Ri}$ in descending order of the costs, and instructs the task executive instruction generator 340 to generate a task executive instruction in accordance with the plan to be implemented at the minimum cost, so that each task is carried out by a robot R responsible therefor based upon locomotion plan information representative of the plans.

$$P_R = \{P_{R1}, P_{R2}, \ldots, P_{Rm}\} \equiv \{P_{Ri}(i=1, 2, \ldots, m)\} \quad (6)$$

where m is the number of plans. Hereupon, if the cost of the plan $P_{R1}$ is denoted by $C_{R1}$, and the cost of the plan $P_{Rm}$ is denoted by $C_{Rm}$, then the following relationship is satisfied:

$$C_{R1} < C_{R2} < \ldots < C_{Rm}.$$

The locomotion plan information as described above may for example be calculated by Dijkstra's algorithm. The locomotion plan information may for example be composed of combinations of position information and the total cumulative distance of segments connected end to end along the route of a robot R from an instantaneous position to a task execution position. Alternatively, the locomotion plan information may be composed of combinations of time information and position information which indicate what time and where the robot R exists.

<Task Executive Instruction Generator>

The task executive instruction generator 340 of FIG. 3 is configured to generate a task executive instruction (data) for causing a robot R to carry out a task.

When the task executive instruction generator 340 receives a signal requesting generation of a task executive instruction (executive instruction request signal) from the database manager 310 or the task manager 330, the task executive instruction generator 340 consults the task schedule database 230 based upon a robot ID included in the received executive instruction request signal, and retrieves a task registered in the task schedule database 230.

If any 'to be executed' task assigned to the robot R specified by the robot ID is located, the task executive instruction generator 340 then generates a task executive instruction (data) for causing the robot R to carry out the task by consulting data of the itemized information stored in the task information database 220. The task executive instruction generator 340 transmits the generated task executive instruction through the input/output device 100 toward the robot R identified by the robot ID.

<Action Optimization Controller>

The action optimization controller 400 is configured to generate an instruction for optimizing actions of a plurality of robots R so that the plurality of robots R can carry out their tasks at a minimized cost, based upon locomotion plan information indicative of locomotion plans of the plurality of robots R, each of the locomotion plans including a route along which a robot R moves from an instantaneous position of the robot R to an execution position of a task assigned to the robot R.

Further, the action optimization controller 400 is configured to determine whether there is any possibility of encounter between robots R based upon distances between the robots R that are moving so as to carry out their own tasks. If any possibility of encounter is discovered, the action optimization controller 400 generates an instruction for preventing a collision of the robots R, such as a plan implementation instruction, a temporary halt instruction or a circumvention instruction.

Figure 5:
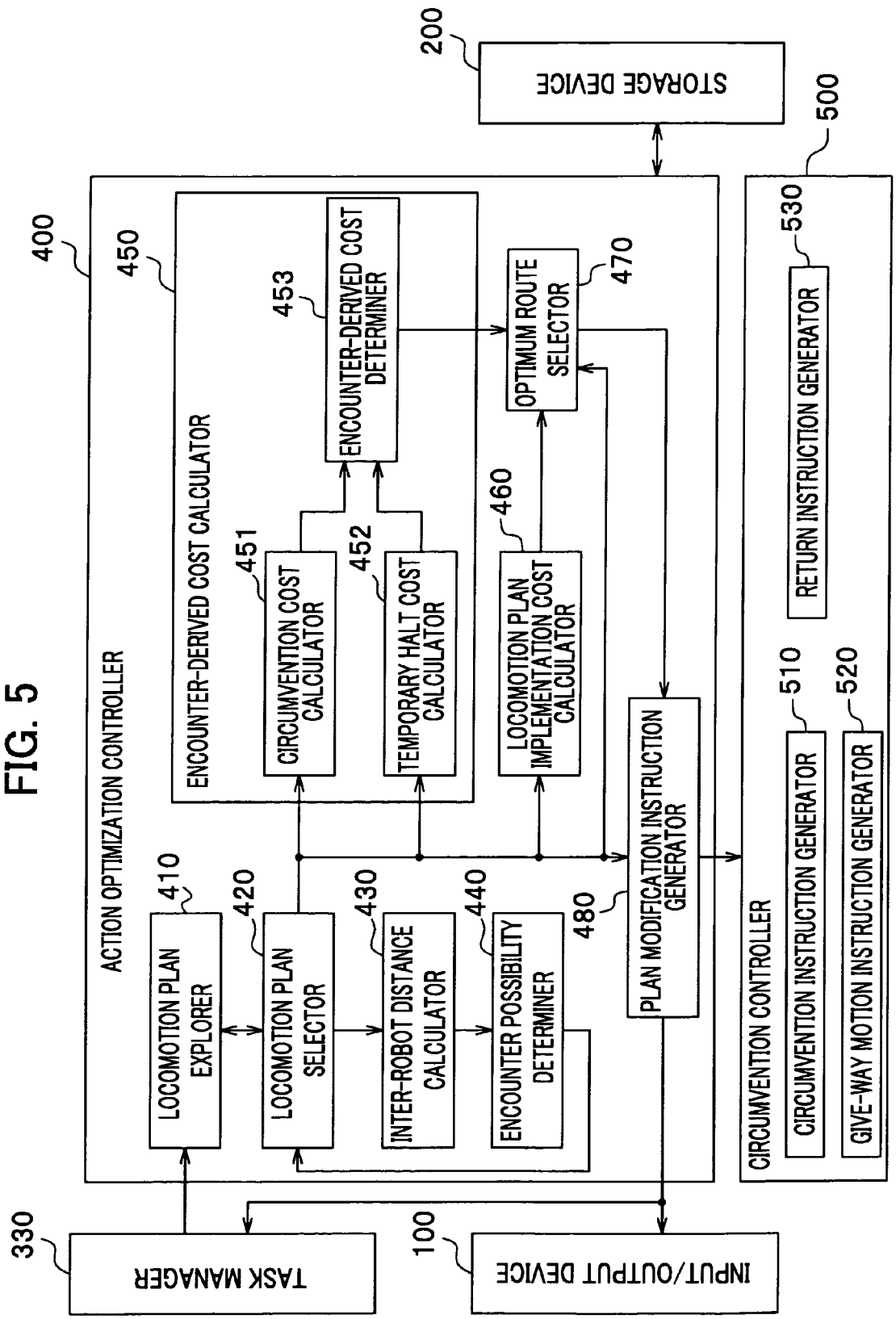
FIG. 5 is a block diagram of an action optimization controller in the robot control apparatus.

The action optimization controller 400 includes, as shown in FIG. 5, a locomotion plan explorer 410, a locomotion plan selector 420, an inter-robot distance calculator 430, an encounter possibility determiner 440, an encounter-derived cost calculator 450, a locomotion plan implementation cost calculator 460, an optimum route selector 470, and a plan modification instruction generator 480.

The locomotion plan explorer 410 acquires locomotion plan information indicative of plans ($P_{RA}$ and $P_{RB}$) calculated in the task manager 330 for execution of tasks assigned to a plurality (two in this embodiment) of robots R (RA and RB), and sort the plans $P_{RA}$ and $P_{RB}$ in descending order of costs based upon the costs $C_{Ai}$ and $C_{Bj}$ of the plans $P_{RA}$ and $P_{RB}$, as shown in Equations (7) and (8).

$$P_{RA} = \{P_{A1}, P_{A2}, \ldots, P_{Am}\} \equiv \{P_{Ai}(i=1,2,\ldots,m)\} \quad (7)$$

$$P_{RB} = \{P_{B1}, P_{B2}, \ldots, P_{Bn}\} \equiv \{P_{Bj}(j=1,2,\ldots,n)\} \quad (8)$$

where m and n represent the number of plans for execution of tasks of robots RA and RB; $C_{A1} < C_{A2} < \ldots < C_{Am}$, $C_{B1} < C_{B2} < \ldots < C_{Bn}$.

In the following description, it is assumed for simplicity's sake that the robot RA is a robot supposed to carry out a task of which the priority Q (precedence) is lower (non-priority robot), and the robot RB is a robot supposed to carry out a task of which the priority Q is higher (priority robot).

The locomotion plan selector 420 selects a combination of i and j in an appropriate manner from the plans $P_{Ai}$ and $P_{Bj}$ for the robots RA and RB, respectively. The locomotion plan selector 420 then transmits the selected combination of plans $P_{Ai}$ and $P_{Bj}$ to the inter-robot distance calculator 430 and the locomotion plan implementation cost calculator 460.

The inter-robot distance calculator 430 is configured to calculate distances between the robots RA and RB (inter-robot distances) for each point of time during implementation of the respective plans $P_{Ai}$ and $P_{Bj}$ or for each position on routes along which the robots RA and RB move toward their task execution positions, in accordance with the locomotion plan information.

The encounter possibility determiner 440 is configured to compare the inter-robot distances respectively with a predetermined value α to determine whether at least one of the inter-robot distances is below the predetermined value. The encounter possibility determiner 440 is further configured to determine that the robots RA and RB have a possibility of encounter if at least one of the inter-robot distances is below the predetermined value α. The predetermined value α has been determined beforehand as a specific value corresponding to a possibility level of encounter to be attended to by the robot RA and/or the robot RB (e.g., collision). If the encounter possibility determiner 440 determines that at least one of the inter-robot distances is below the predetermined value α, the encounter possibility determiner 440 transmits a signal indicating that there is possibility of encounter, to the locomotion plan selector 420.

The encounter-derived cost calculator 450 is configured to calculate an encounter-derived cost $C_h$ entailed when the robot RA and RB make a temporary halt or step aside toward the wall within a passage in order to prevent collision. The encounter-derived cost calculator 450 includes, as shown in FIG. 5, a circumvention cost calculator 451, a temporary halt cost calculator 452, and an encounter-derived cost determiner 453.

The circumvention cost calculator 451 is configured to calculate a circumvention cost $C_a$ ($C_a$: cost active). The circumvention cost $C_a$ is a difference between the total cost entailed when the robots RA and RB pass each other (i.e., the sum of a cost entailed because the priority robot RB moves along a circumvention route that will be described later and a cost entailed because the non-priority robot RA moves to a turnout position that will be described later) and a cost entailed if the necessity for the robots RA and the RB to modify their routes could be obviated.

The temporary halt cost calculator 452 is configured to calculate a temporary halt cost $C_p$ ($C_p$: cost passive). The temporary halt cost $C_p$ is a cost entailed when the non-priority robot RA waits, at a temporary halt position that is before a common portion of the routes on which the robots RA and RB are planned to move, until the priority robot RB passes through the common portion.

The encounter-derived cost determiner 453 is configured to compare the circumvention cost $C_a$ and the temporary halt cost $C_p$ to determine an encounter-derived cost $C_h$ based upon the following Equations (9) and (10):

$$C_h = C_a (\text{if } C_a < C_p) \quad (9)$$

$$C_h = C_p (\text{if } C_a > C_p) \quad (10)$$

The locomotion plan implementation cost calculator 460 is configured to calculate a plan cost (locomotion plan implementation cost) that is the sum of a cost $C_{Ai}$ entailed for the plan $P_{Ai}$ and a cost $C_{Bj}$ entailed for the plan $P_{Bj}$, based upon data on plans $P_{Ai}$ and $P_{Bj}$ output from the locomotion plan selector 420. The locomotion plan implementation cost calculated in the locomotion plan implementation cost calculator 460 is stored in the storage device 200.

The optimum route selector 470 is configured to select a combination of plans that can be implemented at a minimized cost, from the combinations stored in the storage device 200, and to transmit the selected combination of the plans to the plan modification instruction generator 480.

The plan modification instruction generator 480 is configured to generate an instruction or signal (collectively called plan modification instruction) as below based upon the combination of plans selected in the optimum route selector 470. For example, the plan modification instruction generator 480 may generate a plan implementation instruction. The plan implementation instruction is an instruction given to each robot R to implement the selected plan. The plan implementation instruction is transmitted at a predetermined time through the input/output device 100 to the robot R to which plan modification is applied.

The plan modification instruction generator 480 may generate a temporary halt instruction. The temporary halt instruction is an instruction given to the non-priority robot RA to make a temporary halt at a predetermined position until the priority robot RB passes by. The temporary halt instruction is transmitted at a predetermined time through the input/output device 100 to the non-priority robot RA. The plan modification instruction generator may also generate a resumption instruction given to the non-priority robot RA to resume the plan by removing the temporary halt instruction.

The plan modification instruction generator 480 may generate a circumvention instruction signal for causing the circumvention controller 500 to generate instructions to cause the both robots RA and RB to make circumventing actions, and transmit the circumvention instruction signal to the circumvention controller 500.

<Circumvention Controller>

The circumvention controller 500 is configured to generate instructions to cause the robots RA and RB to go ahead toward a direction of their destination while proactively avoiding (passing) each other under control of the action optimization controller 400. Such instructions may include but not limited to a circumvention instruction, a give-way instruction and a return instruction. The above actions of the robots RA and RB are collectively called circumventive actions. The circumventive actions may include as will be described below "circumvention" by the priority robot RB and "give-way" by the non-priority robot RA.

The circumvention controller 500 includes as shown in FIG. 5 a circumvention instruction generator 510, a give-way motion instruction generator 520 and a return instruction generator 530.

The circumvention instruction generator 510 is configured to generate a circumvention instruction as will be described below, based upon a circumvention instruction signal output from the plan modification instruction generator 480 of the action optimization controller 400. The circumvention instruction is transmitted at a predetermined time through the input/output device 100 to the priority robot RB.

The give-way motion instruction generator 520 is configured to generate a give-way motion instruction as will be described below, based upon a circumvention instruction signal output from the plan modification instruction generator 480 of the action optimization controller 400. The give-way motion instruction is transmitted at a predetermined time through the input/output device 100 to the non-priority robot RA.

The return instruction generator 530 is configured to generate a return instruction (return instructions A and B) as will be described below for causing the robots RA and RB to resume implementation of the minimum cost plans $P_{A1}$ and $P_{B1}$ by removing the circumvention instruction and the give-way motion instruction based upon the instantaneous positions of the robots RA and RB.

Next, a detailed description will be given of the circumvention instruction generated in the circumvention instruction generator 510, the give-way motion instruction generated in the give-way motion instruction generator 520, and the return instruction generated in the return instruction generator 530, with reference to FIG. 6.

Figure 6:
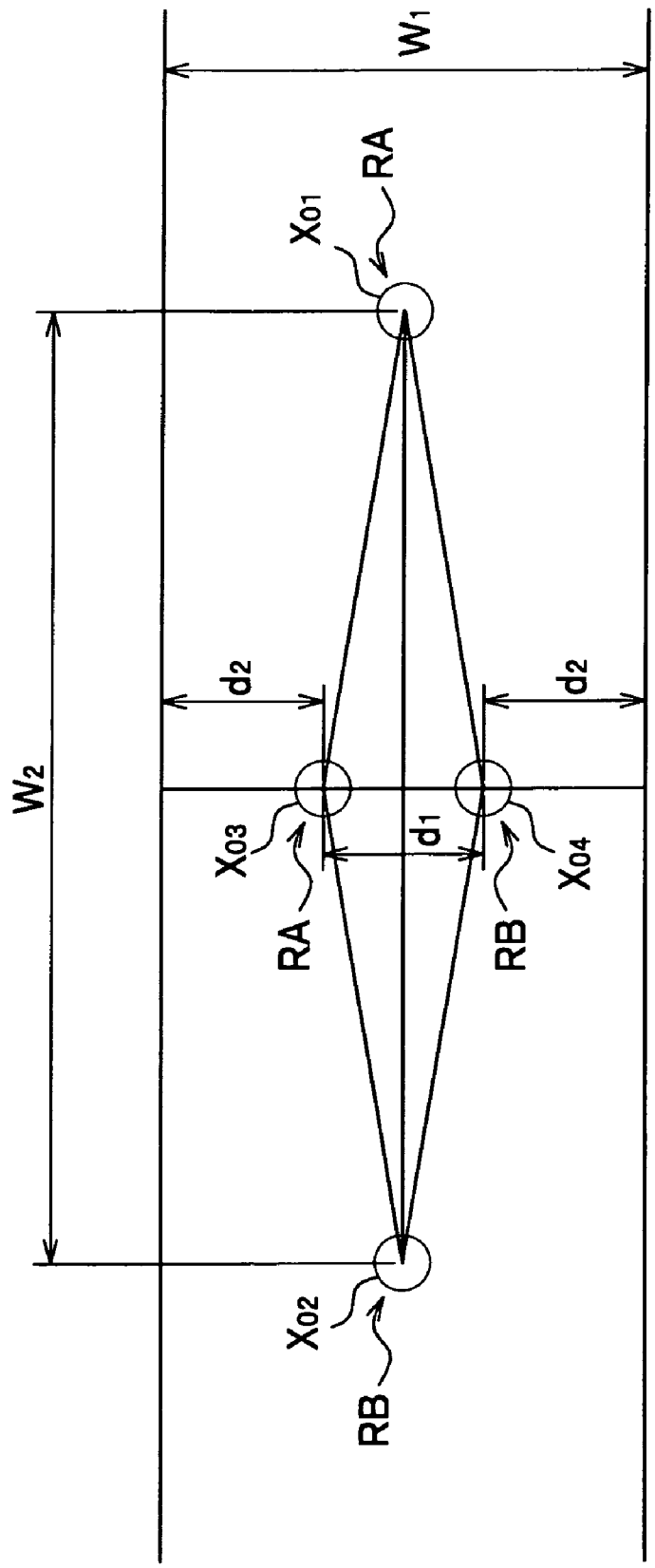
FIG. 6 is a diagram for explaining a circumvention controller in the robot control apparatus.

In an example illustrated in FIG. 6, a passageway in which the robots RA and RB have a predetermined width $W_1$, and predetermined positions $X_{O1}$ and $X_{O2}$ are determined along a median of the passageway with a predetermined spacing $W_2$ allowed therebetween. Predetermined positions $X_{O3}$ and $X_{O4}$ are determined on a line perpendicularly bisecting a line segment produced between the predetermined position $X_{O1}$ and $X_{O2}$. The predetermined positions $X_{O3}$ and $X_{O4}$ are symmetric with respect to the line segment $X_{O1}$-$X_{O2}$, and have a predetermined spacing $d_1$ allowed therebetween, and a predetermined spacing $d_2$ allowed from the walls of the passageway. The positions $X_{O3}$ and $X_{O4}$ will be hereinafter called "give-way position" and "circumvention position", respectively. A route from the predetermined position $X_{O1}$ through the predetermined position $X_{O4}$ to the predetermined position $X_{O2}$ is called "circumvention route". The spacings $d_1$ and $d_2$ are distances determined so that any robots R are not interrupted by detection of an obstacle (i.e., robot R fails to detect another robot and a wall as an obstacle) while the robot R is moving along the passageway. The spacings $d_1$ and $d_2$ may, but not necessarily, be the same distance. The positions $X_{O1}$, $X_{O2}$, $X_{O3}$ and $X_{O4}$ have been determined in advance, for example, based upon map information (e.g., nodes, internode sections, coordinates) stored in the map information database 210 (see FIG. 3).

Assume that, in an initial state where the circumventive actions are to be started (circumventive action start state), the non-priority robot RA moving toward the predetermined position $X_{O2}$ comes to the predetermined position $X_{O1}$ and the priority robot RB moving toward the predetermined position $X_{O1}$ comes to the predetermined position $X_{O2}$.

The circumvention instruction generator 5-10 transmits a circumvention instruction to the priority robot RB at a time, or prior thereto, when the two robots RA and RB comes into the circumventive action start state. The circumvention instruction is an instruction given to the priority robot RB: (1) to wait at the predetermined position $X_{O2}$ until the non-priority robot RA finishes moving to the give-way position $X_{O3}$; (2) to thereafter move from the predetermined position $X_{O2}$ to the circumvention position $X_{O4}$; and (3) to wait at the circumvention position $X_{O4}$ for a return instruction B that will be described below.

The give-way motion instruction generator 520 transmits a give-way motion instruction to the non-priority robot RA at a time, or prior thereto, when the two robots RA and RB comes into the circumventive action start state. The give-way motion instruction is an instruction given to the non-priority robot RA: (1) to move from the predetermined position $X_{O1}$ to the give-way position $X_{O3}$; and (2) to wait at the give-way position $X_{O3}$ for a return instruction A that will be described below.

The return instruction generator 530 transmits a return instruction A to the non-priority robot RA after checking that the priority robot RB has moved to the predetermined position $X_{01}$, and transmits a return instruction B, to the priority robot RB after checking that the priority robot RB has moved to the circumvention position $x_{04}$.

The return instruction A is an instruction given to the non-priority robot RA to move from the give-way position $X_{03}$ to the predetermined position $X_{02}$, from which the non-priority robot RA returns its originally planned route. The return instruction B is an instruction given to the priority robot RB to move from the circumvention position $X_{04}$ to the predetermined position $X_{01}$, from which the priority robot RB returns to its originally planned route.

The next discussion will focus on time costs of the above-described circumvention instruction, give-way motion instruction and return instructions A, B by way of example. For example, assuming that the time costs without circumventive actions of the robots RA and RB moving over the predetermined distance $W_2$ straightforward between the predetermined position $X_{01}$ and the predetermined position $X_{02}$ are for example '1', respectively, the total time cost for the robots RA and RB is '2'. It is also assumed that the time costs to be entailed when the robots RA and RB move straightforward from the predetermined positions $X_{01}$ and $X_{02}$ in their circumventive action start states to the give-way position $X_{03}$ and the circumvention position $X_{04}$, respectively, and the time costs to be entailed when the robots RA and RB is waiting, are for example '0.5', respectively.

In this instance, the action of the robot RA activated by the give-way motion instruction is for example "locomotion (with time cost '0.5')" plus "waiting (with time cost '1.0')". The action of the robot RB activated by the circumvention instruction is for example "locomotion (with time cost '0.5')" plus "waiting (with time cost '0.5')". Similarly, the actions of the robots RA and RB activated by the return instructions A and B are respectively for example "locomotion (with time cost '0.5')".

To sum up, the time costs to be entailed when the robots RA and RB circumventively move over the distance W2 between the predetermined position $X_{01}$ and the predetermined position $X_{02}$ are '2' and '1.5', respectively, i.e., '3.5' in total (for the both robots RA and RB). Accordingly, it is appreciated that in comparison with the total time cost '2' to be entailed when the robots RA and RB move straightforward without circumventive actions, the circumventive actions as required will produce additional (extra) time cost of '3.5−2=1.5' in total.

This additional time cost is the aforementioned circumvention cost $C_a$ calculated in the circumvention cost calculator 451 described above. A plurality of circumvention costs $C_a$ that have been calculated with various patterns of combination may be stored beforehand in the storage device 200 (see FIG. 3), so that the circumvention cost calculator 451 may retrieve the stored circumvention costs $C_a$ on as needed basis.

(Operation of Robot Control System)

First, task information is entered at the terminal 5 (see FIG. 1), and transmitted to the robot control apparatus 3 that is connected through the network 4 with the terminal 5. In the robot control apparatus 3, the task information input from the terminal 5 and transmitted through the input/output device 100 (see FIG. 3) is registered in the task information database 220 by the database manager 310. After the operation of entering the task information at the terminal 5 is completed, the robots R (e.g., RA and RB) are put on standby at their own predetermined positions (home positions).

Under control of the main control unit 40 (see FIG. 2) of each robot R, autonomous motion regulation unit 50 regulates the robot R to carry out a task in accordance with a task executive instruction obtained from the robot control apparatus 3 through the wireless communication unit 60. That is, each robot R follows a task schedule and sequentially executes actions of: retrieving a route from the instantaneous position (home position) to the task execution (start) position (e.g., retrieving paths connecting the nodes); moving along the route; carrying out the task; retrieving a route from the task end position to the home position; and moving back to the home position along the route. During locomotion, the robot R obtains and consults map data stored in the map information database 210 (see FIG. 3), so that the robot R can take the shortest route to the destination, while circumventing obstacles using the obstacle detection unit 80 (see FIG. 2).

Figure 2:
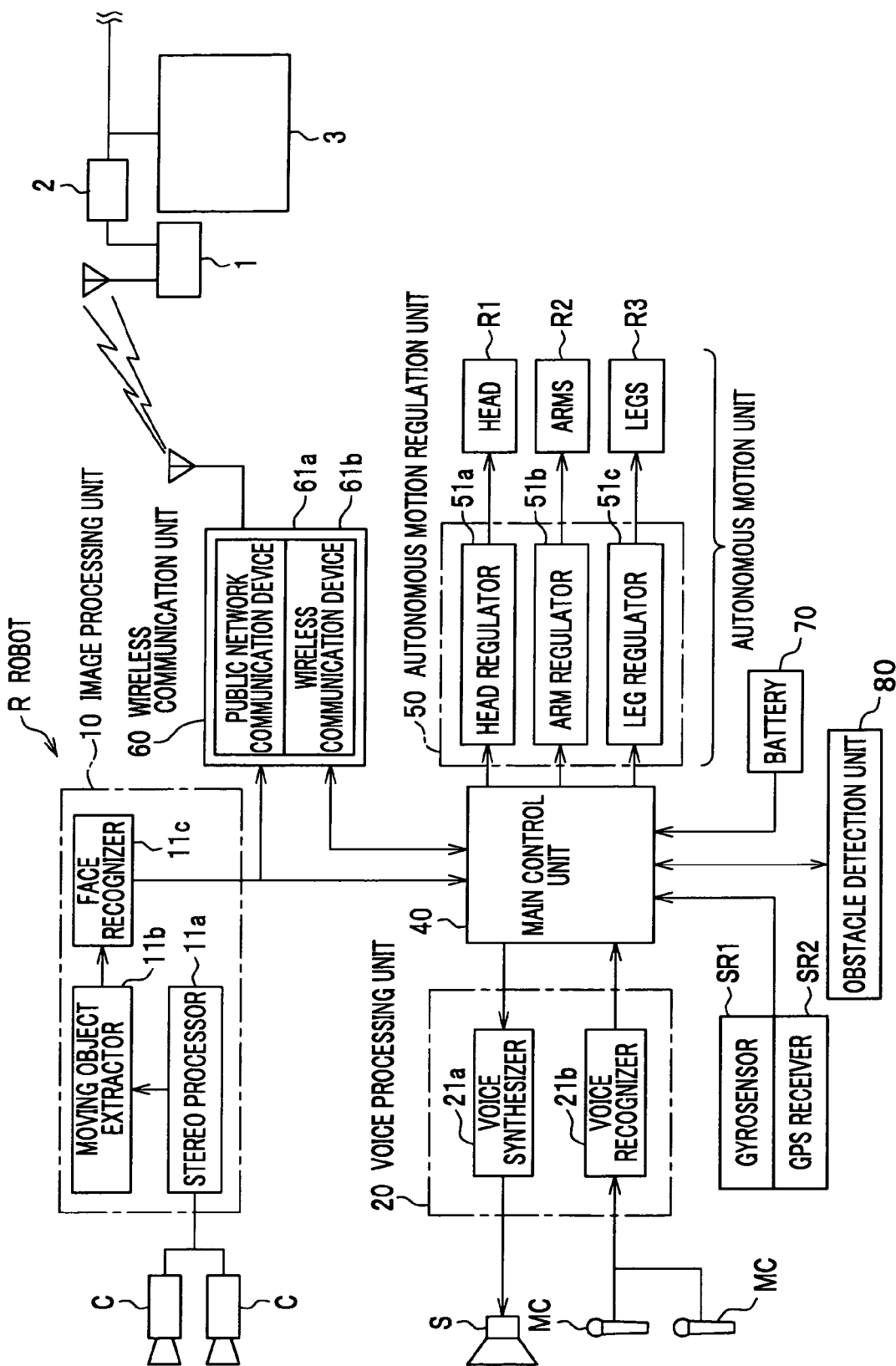
FIG. 2 is a block diagram showing functional units of a robot.

The robots RA and RB periodically generate data (status information) concerning the statuses of the robots RA and RB, respectively, at regular intervals, and transmit the generated status information through their wireless communication units 60 to the robot control apparatus 3, under control of the main control units 40 (see FIG. 2). Hereupon, the status information includes instantaneous information, battery level information and a robot ID. In the robot control apparatus 3, which thus receives the status information through the input/output device 100, the database manager 310 registers the received status information into the robot information database 240.

[Process in the Robot Control Apparatus 3]

Figure 7:
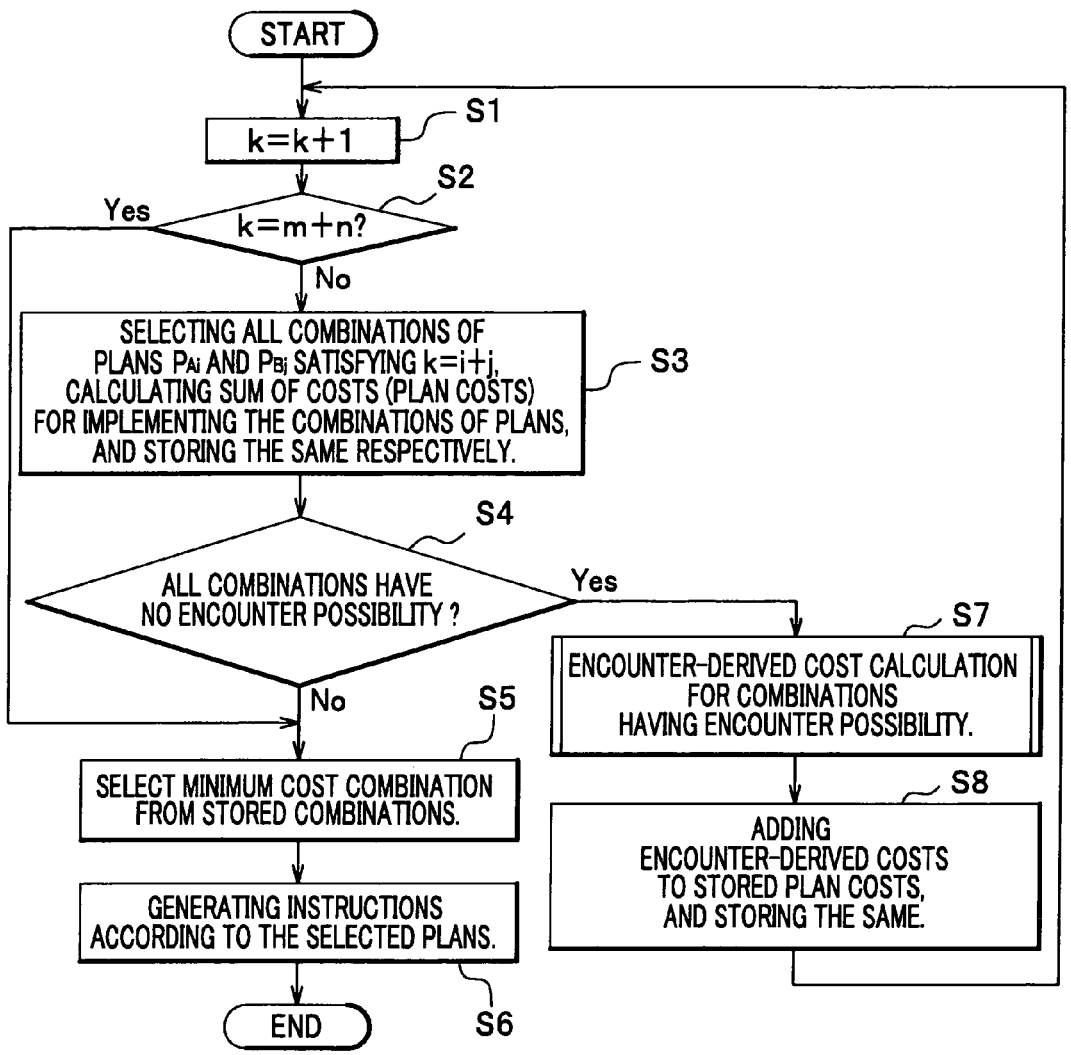
FIG. 7 is a flowchart showing a process executed by an action optimization controller in the robot control apparatus.

Next, referring to FIG. 7 and where appropriate to FIG. 5, an exemplary process carried out in the robot control apparatus 3 will be described hereafter. FIG. 7 is a flowchart showing a process executed by the action optimization controller 400 in the robot control apparatus 3, when two robots R (RA, RB) carry out their planned tasks.

Under control of the robot control apparatus 3, the action optimization controller 400 executes the following process steps as shown in FIG. 7.

It is to be understood that, in the action optimization controller 400, the locomotion plan explorer 410 is configured to explore locomotion plans (hereinafter referred to simply as "plan(s)" where appropriate) for execution of tasks by the robots RA and RB, and to sort the locomotion plans in ascending order of costs calculated for each plan as shown in Equations (7) and (8) above.

The locomotion plan selector 420 of the action optimization controller 400 adds '1' to a variable k (initial value of k is 1) (step S1). The variable k resulting from the addition in step S1 is the sum of a subscript i of plan $P_{RA}$ of the robot RA and a subscript j of plan $P_{RB}$ of the robot RB. The minimum value of the sum is 2, and the maximum value of the sum is m+n. Then the locomotion plan selector 420 of the action optimization controller 400 determines whether k is equal to the sum of m and n (k=m+n) (step S2).

If k is not equal to the sum of m and n (k≠m+n) (No in step S2), i.e., all the combinations of the plans for the robots RA and RB have not been selected yet for cost calculation, the locomotion plan selector 420 of the action optimization controller 400 selects the remaining combinations of the plans $P_{RA}$ and $P_{RB}$ satisfying k=i+j, and the locomotion plan implementation cost calculator 460 of the action optimization controller 400 calculates the sums of the costs for implementing the plans selected (plan costs), and the plan costs respectively calculated in the locomotion plan implementation cost calculator 460 are stored in the storage device 200 (step S3).

For example, if k=2, the locomotion plan selector 420 of the action optimization controller 400 selects a combination of plans with i=1 and j=1; that is, the plan $P_{A1}$ is selected for the robot RA, and the plan $P_{B1}$ is selected for the robot RB.

Similarly, for example, if k=3, the locomotion plan selector 420 of the action optimization controller 400 selects a combination of plans with i=1 and j=2 and a combination of plans with i=2 and j=1.

The inter-robot distance calculator 430 of the action optimization controller 400 calculates distances (inter-robot distances) between the robots RA and RB for each position on routes (for each point of time) assuming that the robot RA is implementing the plan $P_{Ai}$ and the robot RB is implementing the plan $P_{Bj}$. The encounter possibility determiner 440 of the action optimization controller 400 compares the calculated inter-robot distances with a predetermined value α, to determine whether any of the inter-robot distances is below the value α, i.e., whether there is any possibility of encounter of the robots RA and RB. Thus, the encounter possibility determiner 440 of the action optimization controller 400 determines whether all the combinations of the plans $P_{Ai}$ and $P_{Bj}$ satisfying k=i+j involve no possibility of encounter (step S4). For example, if k=3, the encounter possibility determiner 440 of the action optimization controller 400 determines whether a combination of plans with i=1 and j=2 and a combination of plans with i=2 and j=1 involve no possibility of encounter.

If all the combinations have no possibility of encounter (No in step S4), the optimum route selector 470 of the action optimization controller 400 selects the minimum cost combination of plans among the combinations of which the costs are stored in the storage device 200 (step S5). The plan modification instruction generator 480 of the action optimization controller 400 then generates an instruction according to the selected combination of plans (step S6).

To be more specific, if a combination of plans involving no possibility of encounter is supposed to entail a minimum cost, the plan modification instruction generator 480 of the action optimization controller 400 generates a plan implementation instruction. The plan implementation instruction is transmitted at a predetermined time through the input/output device 100 to the robot R to which plan modification is applied. The robot R that has received the plan implementation instruction follows the modified plan as instructed, and moves accordingly to carry out the task assigned to the robot R.

If a combination of plans involving a possibility of encounter with a temporary halt cost $C_p$ entailed is supposed to entail a minimum cost, the plan modification instruction generator 480 of the action optimization controller 400 generates a temporary halt instruction. The temporary halt instruction is transmitted at a predetermined time through the input/output device 100 to the non-priority robot RA. The non-priority robot RA that has received the temporary halt instruction makes a temporary halt at a predetermined position. The robot control apparatus 3 (with the return instruction generator 530 of the circumvention controller 500) instructs the non-priority robot RA to return to the original plan by removing the temporary halt instruction, after checking the priority robot RB has passed the predetermined position.

If a combination of plans involving a possibility of encounter with a circumvention cost $C_a$ entailed is supposed to entail a minimum cost, the plan modification instruction generator 480 of the action optimization controller 400 generates a circumvention instruction signal and transmits the generated circumvention instruction signal to the circumvention controller 500. Based upon the circumvention instruction signal, the circumvention controller 500 causes the circumvention instruction generator 510 to generate a circumvention instruction and causes the give-way motion instruction generator 520 to generate a give-way motion instruction. The thus-generated circumvention instruction is transmitted at a predetermined time through the input/output device 100 to the priority robot RB so that the priority robot RB takes a circumventive action (circumventive motion). The thus-generated give-way motion instruction is transmitted at a predetermined time through the input/output device 100 to the non-priority robot RA so that the non-priority robot RA takes a circumventive action (give-way motion).

On the other hand, if any (at least one) of the combinations satisfying k=i+j has a possibility of encounter (Yes in step S4), the action optimization controller 400 performs an encounter-derived cost ($C_h$) calculation process that will be described later, for the at least one of the combinations having the possibility of encounter (step S7), and calculates the encounter-derived cost ($C_h$). Then, the encounter-derived cost determiner 453 of the action optimization controller 400 adds the encounter-derived cost ($C_h$) to the plan cost stored in the storage device 200, for the at least one of the combinations having the possibility of encounter, and stores the results of addition in the storage device 200 (step S8), and the process returns to step S1.

In a particular instance where determination in step S4 fails to lead to Yes until k=m+n is satisfied (Yes in step S2), it turns out that all the combinations of the plans for the robots RA and RB are selected, and thus the process in the action optimization controller 400 goes to step S5. However, in actuality, the number of combinations may typically be several tens of thousands depending upon the number of nodes in the area where the robots R can move around, so that the determination in step S4 is likely to result in Yes before all the combinations of the plans are selected. Therefore, the determination in step S4 is made to reduce the load of processing (amount of computation) on the action optimization controller 400.

Meanwhile, assuming that the parameter k is k' (k'≠m+n) when step S4 turns out to be Yes, the number Z of combinations of i and j for which computation need to be done until k' is found out is calculated by Equation (11) as follows:

$$\begin{cases} Z = \sum_{t=1}^{k'-1} t & \text{where } k' \le \frac{m+n}{2} + 1 \\ Z = m \times n - \sum_{t=1}^{m+n-k'} t & \text{where } k' > \frac{m+n}{2} + 1, k' \ne m+n \end{cases} \quad (11)$$

Figure 8:
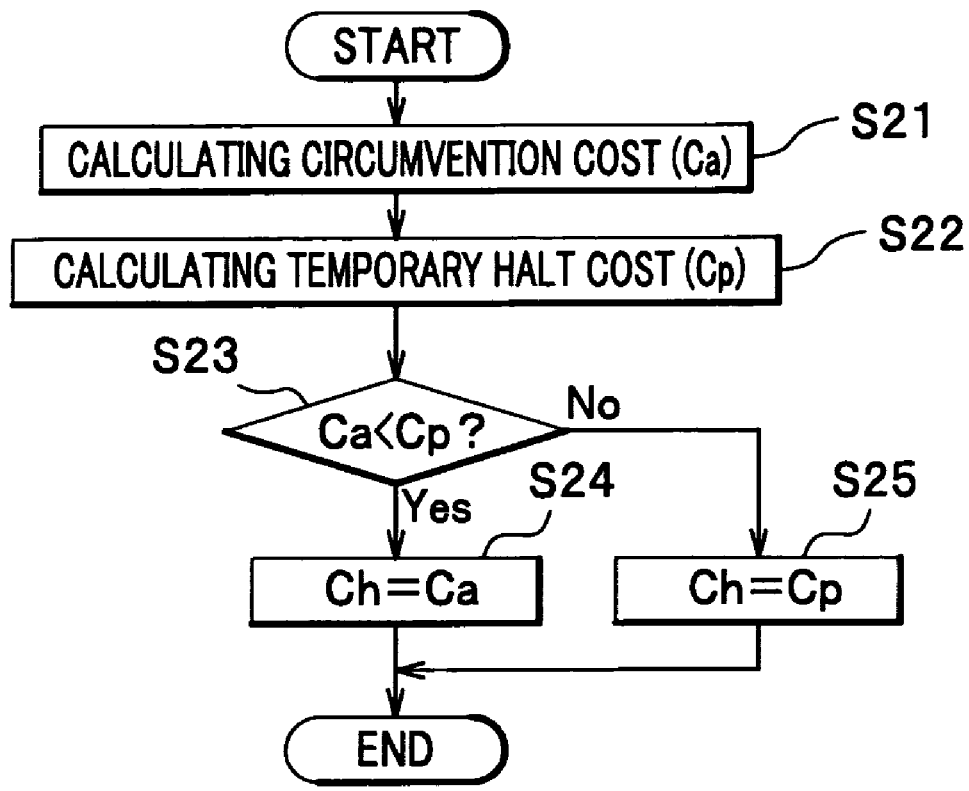
FIG. 8 is a flowchart showing a process for an encounter-derived cost calculation.

Next, referring to FIG. 8 and where appropriate to FIG. 5, an encounter-derived cost ($C_h$) calculation process of step S7 shown in FIG. 7 will be described hereafter. FIG. 8 is a flowchart showing a process for an encounter-derived cost ($C_h$) calculation shown in FIG. 7.

The encounter-derived cost calculator 450 of the action optimization controller 400 executes the following process steps. First, the circumvention cost calculator 451 of the encounter-derived cost calculator 450 calculates a circumvention cost $C_a$ that is an excess cost to be entailed when the robots RA and RB take circumventive actions (step S21). The temporary halt cost calculator 452 of the encounter-derived cost calculator 450 calculates a temporary halt cost $C_p$ that is a cost to be entailed when the non-priority robot RA makes a temporary halt (step S22). Note that the steps S21 and S22 may be performed in reverse order or in parallel.

Subsequent to step S22, the encounter-derived cost determiner 453 of the encounter-derived cost calculator 450 determines whether the circumvention cost $C_a$ calculated in step S21 is smaller than the temporary halt cost $C_p$: $C_a < C_p$ (step S23). If $C_a < C_p$ (Yes in step S23), then the encounter-derived cost determiner 453 calculates an encounter-derived cost $C_h$ using Equation (9) above (step S24). On the other hand, if $C_a \geq C_p$ (No in step S23), then the encounter-derived cost determiner 453 calculates the encounter-derived cost $C_h$ using Equation (10) above (step S25).

Figure 9:
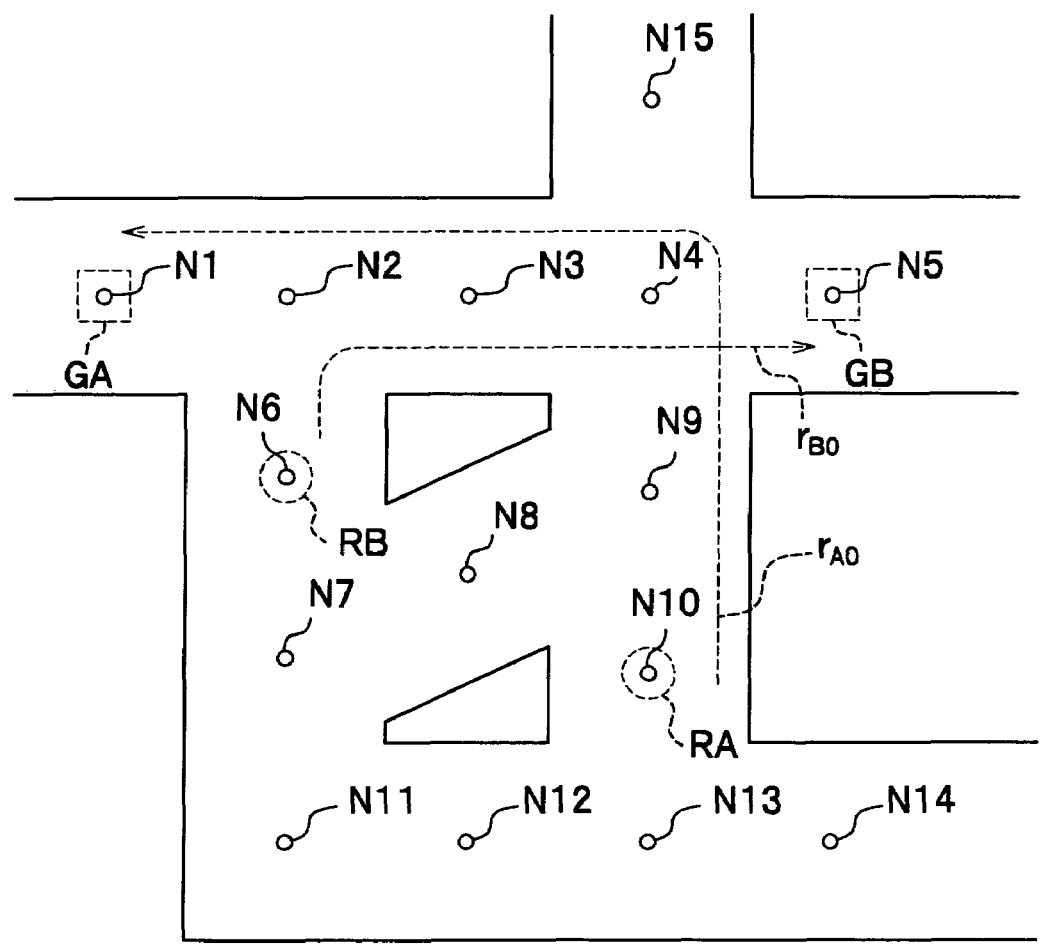
FIG. 9 is a diagram for explaining map information stored in a map information database of the robot control apparatus.

A description of the plan cost and the encounter-derived cost to be involved in combinations of plans will be given next by way of a specific example. FIG. 9 is a diagram for explaining map information stored in the map information database 210 of the robot control apparatus 3. In this example, as shown in FIG. 9, nodes N (N1-N15) are set on the routes along which the non-priority robot RA and the priority robot RB are allowed to move. The costs to be entailed when the robots RA and RB move between nodes N are assumed to be equal and only the time cost will be considered for the sake of simplicity in the following discussion.

Assume that the robot RA is located in a node N10 at present and a task execution position GA of the robot RA is set in a node N1. The robot RA is going to implement a plan $P_{A1}$ for traveling a shortest route $r_{A0}$ based upon the minimum cost $C_{A1}$ to be entailed for moving from the present position to the task execution position GA. Hereupon, the shortest route $r_{A0}$ is N10 →N9→N4→N3→N2→N1, and the cost $C_{A1}$ is '5'.

Similarly, assume that the robot RB is located in a node N6 at present and a task execution position GB of the robot RB is set in a node N5. The robot RB is going to implement a plan $P_{B1}$ for traveling a shortest route $r_{B0}$ based upon the minimum cost $C_{B1}$ to be entailed for moving from the present position to the task execution position GB. Hereupon, the shortest route $r_{B0}$ is N6→N2→N3→N4→N5, and the cost $C_{B1}$ is '4'. It is thus understood that the plan cost of the robots RA and RB is '9' as a whole.

Assuming that the robots RA and RB are scheduled to simultaneously move at a constant velocity to their own task execution positions, respectively, the action optimization controller 400 of the robot control apparatus 3 predicts that the robots RA and RB collide with each other at a position between the nodes N3 and N4, and calculates a cost for avoiding such collision (encounter-derived cost $C_h$).

In the example as illustrated in FIG. 9, there is an alternative plan for the non-priority robot RA to carry out a task, e.g., plan $P_{A2}$ having a locomotion route N10→N9→N8→N7→N6→N2→N1. The cost $C_{A2}$ for this alternative plan $P_{A2}$ will be '6'. Therefore, if the plan for the non-priority robot RA is modified to the plan $P_{A2}$, then the total plan cost for the robots RA and RB will be '10'. In this instance where the plan $P_{A2}$ is adopted, the robots RA and RB has no possibility of colliding with each other, and thus no encounter-derived cost $C_h$ is entailed.

One way of avoiding a collision, which would occur when the robot RA implements the plan $P_{A1}$ and the robot RB implements the plan $P_{B1}$, is to cause the non-priority robot RA to make a temporary halt at the node N9 until the priority robot RB moves from the node N2 to the node N5. The cost to be entailed, which corresponds to the waiting period of time, during this temporary halt approach, is '3'. Accordingly, the temporary halt cost $C_p$ is '3'.

Another way of avoiding the collision, which would occur when the robot RA implements the plan $P_{A1}$ and the robot RB implements the plan $P_{B1}$, is to cause the robot RA and RB to take circumventive actions for example between the node N3 and the node N4. Normally, the robots RA and RB can move between the node N3 and the node N4 at the minimum total cost of '2'; however, the cost to be entailed during this circumvention approach, which may be estimated as described above with reference to FIG. 6, is '3.5'. Accordingly, the circumvention cost $C_a$ is '1.5'.

In this instance, the circumvention cost $C_a$ is smaller than the temporary halt cost $C_p$, and thus the circumvention cost $C_a$ is adopted as the encounter-derived cost $C_h$. The encounter-derived cost $C_h$='1.5' is added to the total plan cost '9' to be entailed when the robot RA implements the plan $P_{A1}$ and the robot RB implements the plan $P_{B1}$. Finally, the total cost to be entailed when the robots RA and RB carry out their tasks turns out to be '10.5'.

According to the present embodiment, the robot control apparatus 3 is configured to select a minimum-cost combination of plans from both of combinations with consideration given to the encounter-derived cost $C_h$ and combinations with no consideration given thereto, based upon the instantaneous position and the task execution positions of the robots RA and RB, to thereby generate an appropriate instruction. Therefore, the robots RA and RB can take optimized actions when they carry out their tasks.

Although the preferred embodiments of the present invention have been described above, various modifications and changes may be made in the present invention without departing from the spirit and scope thereof. For example, in the above embodiment, two robots RA and RB are provided for the sake of simplicity, but the number of the robots R may be more than three. Objects with which the robots R may risk an encounter are not limited to other robots but may include for example any objects at rest which can be located at specific positions.

Further, in the present embodiment, the plan cost and encounter-derived cost calculated for combinations of plans are exemplified by time costs calculated by arithmetical addition, but not limited thereto; rather the costs may be calculated in view of various aspects. For example, the control scheme may be designed so that the tasks can be completed as soon as possible as a whole. An alternative plan implementation instruction will be described in view of this scheme, with reference to FIG. 9.

As described above, take, for example, a plan $P_{A2}$ having a locomotion route N10→N9→N8→N7→N6→N2→N1; the cost $C_{A2}$ is '6'. The sum of the cost $C_{A2}$ and the cost $C_{B1}$ (='4') of the plan $P_{B1}$ is '10'. Accordingly, the time of completion of all the tasks depends upon the cost $C_{A2}$ (='6') of the non-priority robot RA. Then, the action optimization controller 400 explores the plans of the robots RA and RB so that the time of completion of all the tasks comes as soon as possible while keeping the plan cost of the robots RA and RB as a whole at '10'. To be more specific, the action optimization controller 400 generates a plan implementation instruction to change the plan of the priority robot RB into another plan $P_{B2}$, to modify the locomotion route of the priority robot RB. In accordance with this plan, the locomotion route of the priority robot RB is N6→N7→N8→N9→N4→N5, and the cost $C_{B2}$ is '5'. Thus, the breakdown of the total locomotion cost is as follows: the cost $CA_1$ of the non-priority robot RA is '5'; and the cost $C_{B2}$ of the priority robot RB is '5'. Accordingly, the time of completion of all the tasks is determined by the costs $C_{A1}$, $C_{B2}$(='5'). As a result, the time of completion of all the tasks can come earlier than that which comes when the plan of the non-priority robot RA is modified.

Moreover, the plan cost and encounter-derived cost in the present embodiment are exemplified by the time cost, but the cost may include an energy cost or a combination of the time cost and the energy cost. Hereupon, the energy cost includes, for example, a battery level or power consumption. The minimized cost of the energy cost may be achieved by saving the battery power consumption as much as possible. In an embodiment where the time and energy costs are combined, the time cost and the energy cost may be weighted in a desired proportion.

Figure 10A:
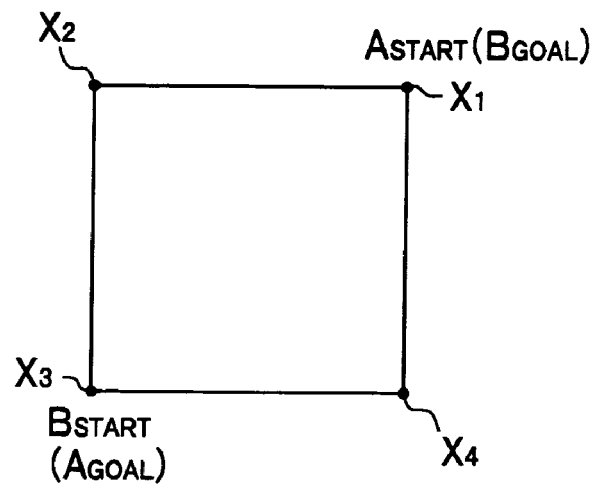
FIG. 10A is a diagram for explaining a process executed by the action optimization controller in the robot control apparatus in an exemplary implementation of the present invention.

Further, in the present embodiment, under control of the action optimization controller 400 of the robot control apparatus 3, the encounter possibility determiner 440 is configured to determine the possibility of encounter between the robots RA and RB based upon the distances varying with the time. If it is determined that there is a possibility of encounter, determination as to whether a circumventive action can be taken may be made for example based upon the width of the passageway (i.e., map information, etc.) at the position (e.g., node, etc.) where the encounter can take place. Furthermore, determination as to whether the non-priority robot RA can make a temporary halt may be made for example based upon the order of connection of the positions (e.g., nodes, etc.) along the route where the encounter can take place. In this alternative embodiment, the encounter-derived cost can be calculated swiftly even if the situation is for example as shown in FIG. 10A. In this instance, as shown in FIG. 10A, it is assumed that there is a passageway allowing only one robot R to pass along a route shaped like a square having four vertexes $X_1$, $X_2$, $X_3$ and $X_4$. The robot RA is located on the vertex $X_1$ (initial instantaneous position $A_{START}$) at present, facing toward the vertex $X_3$ (task execution end position $A_{GOAL}$), and scheduled to move along a predetermined route $X_1 \rightarrow X_2 \rightarrow X_3$ in accordance with a plan $P_{A1}$. The robot RB is located on the vertex $X_3$ (initial instantaneous position $B_{START}$) at present, facing toward the vertex $X_1$ (task execution end position $B_{GOAL}$), and scheduled to move along a predetermined route $X_3 \rightarrow X_2 \rightarrow X_1$ in accordance with a plan $P_{B1}$. In short, this instance exemplifies the situation such that collision cannot be avoided by a temporary halt of the non-priority robot RA. Accordingly, in this instance, it is to be determined that there is a possibility of encounter between the robots RA and RB at the vertex $X_2$ while the circumventive actions and the temporary halt motion is not effective to avoid the collision. It is to be understood that the encounter-derived cost $C_h$ is infinite. Thus, another combination of plans may be selected as a minimum-cost plan. The plan implementation instruction in this instance may include, for example, an instruction given to the non-priority robot RA to carry out a plan $P_{A2}$ in which the locomotion route is defined to be $X_1 \rightarrow X_4 \rightarrow X_3$. This embodiment makes it possible to omit the process of calculating costs for actions determined in advance to be inexecutable, and to thereby reduce the load of processing (computation).

In the embodiment described above, the plan is defined as a locomotion route to a single task execution position, but the present invention is not limited thereto. An exemplified process which may be achieved in view of an alternative scheme will be described below with reference to FIG. 10B.

Figure 10B:
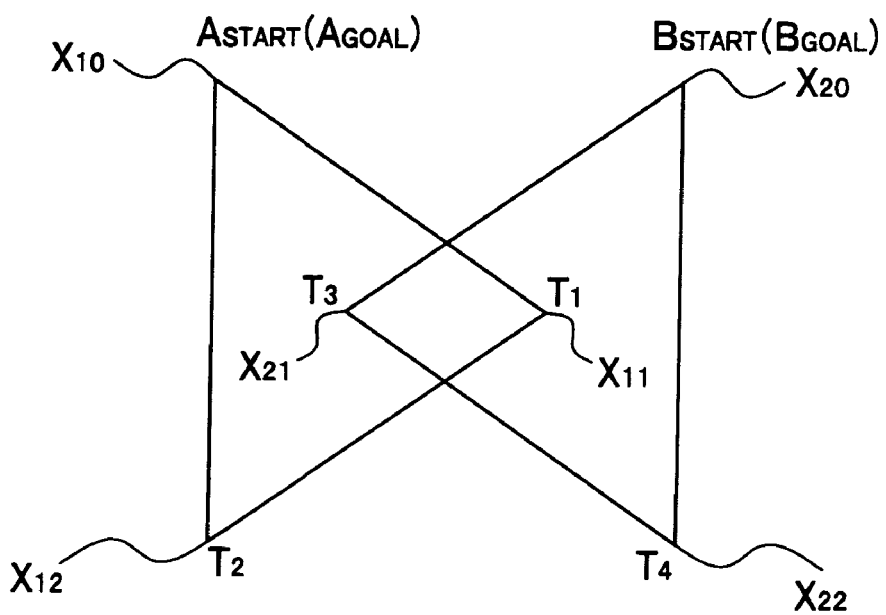
FIG. 10B is a diagram for explaining a process executed by the action optimization controller in the robot control apparatus in an alternative implementation of the present invention.

As shown in FIG. 10B, it is assumed that there is two passageways: one connecting three vertexes $X_{10}$, $X_{11}$ and $X_{12}$ of an equilateral triangle; and the other connecting three vertexes $X_{20}$, $X_{21}$ and $X_{22}$ of another equilateral triangle. The two equilateral triangles are arranged axisymmetrically and overlap each other so that the segments $X_{10}$-$X_{11}$ and $X_{11}$-$X_{12}$ intersect with the segments $X_{20}$-$X_{21}$ and $X_{21}$-$X_{22}$, respectively. Similar tasks $T_1$-$T_4$ are divided into two and distributed equally to the robots RA and RB for execution. The robot RA is located on the vertex $X_{10}$ (initial instantaneous position $A_{START}$) at present, and scheduled to carry out a task $T_1$ at the vertex $X_{11}$, and thereafter a task $T_2$ at the vertex $X_{12}$ while moving toward the same vertex $X_{10}$ as a task execution end position $A_{GOAL}$ along a predetermined route $X_{10} \rightarrow X_{11} \rightarrow X_{12} \rightarrow X_{10}$ in accordance with a plan $P_{A1}$. Similarly, the robot RB is located on the vertex $X_{20}$ (initial instantaneous position $B_{START}$) at present, and scheduled to carry out a task $T_3$ at the vertex $X_{21}$ and thereafter a task $T_4$ at the vertex $X_{22}$ while moving toward the same vertex $X_{20}$ as a task execution end position $A_{GOAL}$ along a predetermined route $X_{20} \rightarrow X_{21} \rightarrow X_{22} \rightarrow X_{20}$ in accordance with a plan $P_{B1}$. In short, the robot RA is scheduled to carry out the task $T_1$ and then the task $T_2$, while the robot RB is scheduled to carry out the task $T_3$ and then the task $T_4$.

In this instance, the robots RA and RB can be caused to take their actions at the same minimized costs. That is, for example, the non-priority robot RA may be instructed to implement another plan PA2 involving the locomotion route of $X_{10} \rightarrow X_{12} \rightarrow X_{11} X_{10}$. In other words, the order of execution of the tasks assigned to the robot RA may be modified so that the robot RA carry out the task $T_2$ and then the task $T_1$. For this reason, the action optimization controller 400 may instruct the task manager 330 to modify the schedule stored for each task in the task schedule database 230.

The action optimization controller 400 of the robot control apparatus 3 according to the present embodiment may be implemented as follows: if the robot R makes a temporary halt upon detection of an obstacle on the route, the action optimization controller 400 transmits a plan switch request signal for requesting a switch of the plan (passageway to travel) to the robot control apparatus 3. Hereupon, the robot R repeats an obstacle detecting operation at regular predetermined intervals, and if the robot R detects an obstacle at the same place after a predetermined number of obstacle detecting operations are repeated, then the action optimization controller 400 transmits the plan switch request signal.

In operation, under control of the action optimization controller 400 of the robot control apparatus 3, the locomotion plan selector 420 generates an instruction for optimizing the action of the relevant robot R, based upon a plan different (switched) from the original plan. The plan modification instruction generator 480 of the action optimization controller 400 generates a plan modification instruction given to the relevant robot R to carry out a task assigned to the robot R in accordance with that different (switched) plan.

With this implementation, even if an accidental disturbance that would force a robot R to make a temporary halt arises, such as a temporarily closed area to passage on the passageway along which the robot R travels, and a door at the passage way unintentionally left open, the robot R can carry out a predetermined task without fail by taking a secure detour. In this instance, it would be more preferable that a consideration be given to the battery level or other energy cost.

It is contemplated that numerous modifications may be made to the exemplary embodiments of the invention without departing from the spirit and scope of the embodiments of the present invention as defined in the following claims.

What is claimed is:

1. A robot control apparatus for controlling a plurality of mobile robots each of which includes a position information acquisition device for acquiring an instantaneous position and is configured to carry out a predetermined task, the apparatus comprising:

a robot information storage device in which the instantaneous position acquired by the position information acquisition device of each mobile robot are storable;

a task information storage device in which task information is storable, the task information including an execution position and a priority for each task to be executed by a mobile robot responsible therefor; and an action optimization controller configured to generate an instruction for optimizing actions of the plurality of mobile robots so that any of the plurality of mobile robots carry out the tasks at a minimized cost, based upon locomotion plan information indicative of locomotion plans of the plurality of mobile robots, each of the locomotion plans including a route along which each mobile robot moves from an instantaneous position of the mobile robot stored in the robot information storage device to an execution position of a task stored in the task information storage device, wherein the action optimization controller includes:

a locomotion plan explorer configured to sort the locomotion plans by costs for exploration;

a locomotion plan selector configured to select at least one locomotion plan from the locomotion plans sorted in the locomotion plan explorer;

a locomotion plan implementation cost calculator configured to calculate a locomotion plan implementation cost to be entailed when the plurality of mobile robots move in accordance with the locomotion plan information updated by the at least one locomotion plan selected in the locomotion plan selector;

a distance calculator configured to calculate distances from the plurality of mobile robots to obstacles for each point of time during implementation of the locomotion plans or for each position on routes along which the plurality of mobile robots move, in accordance with the locomotion plan information updated by the at least one locomotion plan selected in the locomotion plan selector;

an encounter possibility determiner configured to compare the distances calculated by the distance calculator with a predetermined value, and to determine that at least one of the plurality of mobile robots has a possibility of encounter with an obstacle if at least one of the distances is below the predetermined value;

an encounter-derived cost calculator configured to calculate an encounter-derived cost if the encounter possibility determiner determines that at least one of the plurality of mobile robots has a possibility of encounter with an obstacle;

an optimum route selector configured to determine optimum locomotion plan information such that the tasks are carried out at a minimized cost, based upon the locomotion plan implementation cost calculated by the locomotion plan implementation cost calculator and the encounter-derived cost calculated by the encounter-derived cost calculator; and a plan modification instruction generator configured to generate a plan modification instruction for causing at least one of the plurality of mobile robots to move in accordance with the optimum locomotion plan information determined by the optimum route selector.

2. A robot control apparatus according to claim 1, wherein the obstacles include another mobile robot; and wherein the encounter-derived cost calculator comprises a temporary halt cost calculator configured to calculate a cost required for a temporary halt such that a first mobile robot responsible for a lower priority task waits at a temporary halt position on a planned route until a second mobile robot responsible for a higher priority task passes through a common portion of routes on which the first and second mobile robots are planned to move; and wherein the plan modification instruction includes an instruction given to the first mobile robot to make a temporary halt at the temporary halt position if the sum of the cost calculated by the temporary halt cost calculator and a cost to be entailed when at least one locomotion plan for the at least one of the plurality of mobile robots determined by the encounter possibility determiner to have a possibility of encounter with an obstacle is implemented turns out to be the minimized cost.

3. A robot control apparatus according to claim 1, further comprising a circumvention controller which comprises:

a give-way motion instruction generator configured to generate a give-way motion instruction for causing a first mobile robot responsible for a lower priority task to move from a first route determined based upon the selected locomotion plan information to a give-way position so as to give way to a second mobile robot responsible for a higher priority task; and a return instruction generator configured to generate a return instruction for causing the first mobile robot to return from the give-way position to the first route, wherein the encounter-derived cost calculator comprises a circumvention cost calculator configured to calculate a difference between a cost to be entailed when the first mobile robot moves to the give-way position and a cost to be entailed when the first mobile robot proceeds along the first route without moving to the give-way position; and wherein the plan modification instruction includes the give-way motion instruction and the return instruction given to the circumvention controller if the sum of the cost calculated by the circumvention cost calculator and a cost to be entailed when at least one locomotion plan for the at least one of the plurality of mobile robots determined by the encounter possibility determiner to have a possibility of encounter with an obstacle is implemented turns out to be the minimized cost.

4. A robot control apparatus according to claim 1, further comprising a circumvention controller which comprises:

a give-way motion instruction generator configured to generate a give-way motion instruction for causing a first mobile robot responsible for a lower priority task to move from a first route determined based upon the selected locomotion plan information to a give-way position so as to give way to a second mobile robot responsible for a higher priority task;

a circumvention instruction generator configured to generate a circumvention instruction for causing the second mobile robot to move from a second route determined based upon the selected locomotion plan information to a circumvention position so as to allow the first and second mobile robots to pass each other; and a return instruction generator configured to generate a return instruction for causing the first mobile robot to return from the give-way position to the first route, and the second mobile robot to return from the circumvention position to the second route;

wherein the encounter-derived cost calculator comprises a circumvention cost calculator configured to calculate a difference between the sum of costs to be entailed when the first and second mobile robots move to the give-way position and circumvention position respectively, and a cost to be entailed when the first and second mobile robots proceed along the first and second route without moving to the give-way position and the circumvention position, respectively; and wherein the plan modification instruction includes the give-way motion instruction, the circumvention instruction and the return instruction given to the circumvention controller if the sum of the cost calculated by the circumvention cost calculator and a cost to be entailed when at least one locomotion plan for the at least one of the plurality of mobile robots determined by the encounter possibility determiner to have a possibility of encounter with an obstacle is implemented turns out to be the minimized cost.

5. A robot control apparatus according to claim 1, wherein the action optimization controller is further configured to receive a plan switch request signal from a mobile robot, and to generate, in response to the received plan switch request signal, an instruction for optimizing an action of the mobile robot based upon locomotion plan information indicative of another locomotion plan different from a locomotion plan originally assigned to the mobile robot.

* * * * *